United States Patent
Ke et al.

(10) Patent No.: US 12,356,092 B2
(45) Date of Patent: Jul. 8, 2025

(54) NOISE FILTERING FOR DYNAMIC VISION SENSOR

(71) Applicants: Chengdu SynSense Technology Co., Ltd., Sichuan (CN); ShenZhen SynSense Technology Co., Ltd., Guangdong (CN); Shanghai SynSense Technology Co., Ltd., Shanghai (CN)

(72) Inventors: LingYun Ke, Shanghai (CN); Ning Qiao, Guangdong (CN); Weitao Zeng, Sichuan (CN); Min Wang, Sichuan (CN); Zheng Ke, Sichuan (CN); Kai Zhou, Sichuan (CN); Yudi Ren, Sichuan (CN); Lin Zhang, Sichuan (CN); Jianjun Fan, Sichuan (CN); Junjun Yu, Sichuan (CN); Jun Wang, Sichuan (CN); Xiwen Gong, Sichuan (CN)

( * ) Notice: Subject to any disclaimer, the term of this patent is extended or adjusted under 35 U.S.C. 154(b) by 0 days.

(21) Appl. No.: 18/260,206

(22) PCT Filed: Dec. 27, 2021

(86) PCT No.: PCT/CN2021/141813
§ 371 (c)(1),
(2) Date: Jun. 30, 2023

(87) PCT Pub. No.: WO2023/092798
PCT Pub. Date: Jun. 1, 2023

(65) Prior Publication Data
US 2024/0064422 A1    Feb. 22, 2024

(30) Foreign Application Priority Data

Nov. 25, 2021 (CN) .......................... 202111413612.X
Dec. 14, 2021 (CN) .......................... 202111522469.8
Dec. 14, 2021 (CN) .......................... 202111522819.0

(51) Int. Cl.
*H04N 25/47* (2023.01)
*H04N 25/618* (2023.01)
*H04N 25/67* (2023.01)

(52) U.S. Cl.
CPC ........... *H04N 25/47* (2023.01); *H04N 25/618* (2023.01)

(58) Field of Classification Search
CPC ...... H04N 25/47; H04N 25/618; H04N 25/60; H04N 25/67; H04N 1/2137; H04N 1/2141;
(Continued)

(56) References Cited

U.S. PATENT DOCUMENTS

| 10,892,012 B2 | 1/2021 | Majumder et al. |
| 2013/0058577 A1* | 3/2013 | Stubler ............... G06F 18/23 382/195 |

(Continued)

FOREIGN PATENT DOCUMENTS

| CN | 111031266 A | 4/2020 |
| CN | 111064865 A | 4/2020 |

(Continued)

OTHER PUBLICATIONS

International Search Report (with English translation) and Written Opinion issued in PCT/CN2021/141813, dated Aug. 22, 2022, 8 pages provided.

*Primary Examiner* — Marly S Camargo
(74) *Attorney, Agent, or Firm* — Michael D Eisenberg

(57) ABSTRACT

A noise filtering device, method, and chip for a dynamic vision sensor (DVS), and an event-driven vision device, and an electronic device are provided. In order to meet multi-dimensional requirements of a denoising solution such as power consumption, delay, storage resources, calculation resources, denoising effect, applicable range of noise types,
(Continued)

and hardware implementation difficulty, in this disclosure, global space-domain and time-domain informations are simultaneously aggregated in a shift register, or latest time-domain informations are collected through a space domain, and finally, whether an event generated by a DVS is a noise event is judged on the basis of clustering of space-domain informations and the time-domain informations. While achieving excellent denoising performance, this disclosure has outstanding advantages in the aforementioned multiple dimensions because of advantages of parallel and simple calculation and no dependence on a DVS resolution, etc.

20 Claims, 10 Drawing Sheets

(58) Field of Classification Search
CPC .................. G06V 20/44; G06V 10/82; G06T 2207/20182
See application file for complete search history.

(56) References Cited

U.S. PATENT DOCUMENTS

| | | | |
|---|---|---|---|
| 2018/0098082 A1* | 4/2018 | Burns | H04N 19/117 |
| 2019/0043583 A1* | 2/2019 | Majumder | G11C 15/04 |
| 2019/0317834 A1* | 10/2019 | Ebrahimi | G06F 17/18 |
| 2019/0356849 A1* | 11/2019 | Sapienza | G06V 20/10 |
| 2020/0228392 A1* | 7/2020 | Kushmerick | H04L 67/131 |
| 2021/0321052 A1* | 10/2021 | Cossairt | H04N 23/45 |
| 2022/0170375 A1* | 6/2022 | Seo | H04N 25/46 |

FOREIGN PATENT DOCUMENTS

| | | |
|---|---|---|
| CN | 111770290 A | 10/2020 |
| CN | 112232356 A | 1/2021 |
| CN | 113408671 A | 9/2021 |

* cited by examiner

Before Denoising     After Denoising

NOISE FILTERING FOR DYNAMIC VISION SENSOR

CROSS-REFERENCE TO RELATED APPLICATIONS

This disclosure is a U.S. national phase application of a PCT Application No. PCT/CN2021/141813 filed on Dec. 27, 2021, which claims priority to a Chinese Patent Application No. 202111522469.8 filed with the China patent office on Dec. 14, 2021 ("NOISE REDUCTION DEVICE AND METHOD, CHIP, EVENT IMAGING DEVICE AND ELECTRONIC EQUIPMENT"), a Chinese Patent Application No. 202111522819.0 filed with the China patent office on Dec. 14, 2021 ("NOISE PROCESSING DEVICE AND METHOD, CHIP, EVENT IMAGING DEVICE AND ELECTRONIC EQUIPMENT"), and a Chinese Patent Application No. 202111413612.X filed with the China patent office on Nov. 25, 2021 ("CLUSTERING NOISE REDUCTION DEVICE AND METHOD, CHIP, EVENT IMAGING DEVICE AND ELECTRONIC EQUIPMENT"), the disclosures of which are incorporated in their entirety by reference herein.

FIELD OF DISCLOSURE

This disclosure relates to technology of noise filtering for dynamic vision sensors (DVSes), and more particularly to technology of noise filtering combined with a space-domain information and a time-domain information performed on a spike event generated by a DVS.

BACKGROUND OF DISCLOSURE

Event-driven vision devices such as dynamic vision sensors (DVSes) are novel imaging technology. Unlike traditional frame-based image sensors, DVSes only capture dynamic informations within a field of view and each pixel operates independently and asynchronously. High dynamic ranges, low light performance, ultra-low latency, and ultra-low data redundancy have made DVSes a research hotspot in recent years.

Because of various undesirable factors, pixels in event-driven vision devices can generate noise events. However, current denoising solutions generally have more or fewer deficiencies. It is difficult for current denoising solutions to meet application needs. Ideally, the art desires a denoising solution that can filter various noise at high speed, in real time, and accurately, that has low calculation and storage resource consumption, and low power consumption, and that is easily implemented in hardware. It is extremely challenging in the art to provide the solution that can meet these requirements simultaneously in multiple dimensions or basically.

SUMMARY OF DISCLOSURE

In this disclosure, a part or all of the aforementioned technical problems are solved or alleviated by the following technical solutions:

A denoising device, wherein the denoising device receives a new event output by an event-driven vision device, wherein a data information of the new event comprises at least a coordinate information of the new event, wherein the denoising device comprises: first storage space configured to store a data information of each of some historical events in a first-in-first-out manner, wherein the data information of each of the some historical events comprises at least a coordinate information of each of the some historical events; a calculating module configured to calculate a respective coordinate distance between the coordinate information of the new event and the coordinate information of each of the some historical events in the first storage space; a first judging module configured to judge whether the coordinate distance is within a first preset range, and obtain a relationship value between the new event and each of the some historical events on the basis of a judgment result; a summing module configured to add the relationship value between the new event and each of the some historical events together and obtain a sum of relationship values between the new event and the some historical events, wherein the relationship value between the new event and each of the some historical events is obtained by the first judging module; and a second judging module configured to, according to a magnitude relationship between the sum of the relationship values output by the summing module and a second preset value, judge whether the new event is a valid event or a noise event.

In some type of embodiments, after the new event is judged to be a valid event or a noise event, the data information of each of earliest at least one event of the some historical events is shifted out of the first storage space.

In some type of embodiments, after the data information of each of the earliest at least one event of the some historical events is shifted out of the first storage space, the data information of the new event is stored in the first storage space, wherein the data information of the new event comprises at least the coordinate information of the new event.

In some type of embodiments, if the new event is a valid event, the data information of each of the earliest at least one event of the some historical events is shifted out of the first storage space, and the data information of the new event is stored in the first storage space.

In some type of embodiments, the first storage space is a shift register array.

In some type of embodiments, the denoising device further comprises an input stage buffer configured to buffer the new event that is received; when the new event is judged to be a noise event by the second judging module, the new event in the input stage buffer is discarded or filtered out.

In some type of embodiments, the calculating module calculates the coordinate distance between the coordinate information of the new event and the coordinate information of each of the some historical events in the first storage space in parallel through addition and/or subtraction.

In some type of embodiments, each of the following informations further comprises a time information: the data information of the new event and the data information of each of the some historical events;

the denoising device further comprises a band-pass filtering module configured to perform band-pass filtering on the basis of a time interval of an occurrence of the new event.

In some type of embodiments, both the time information of the new event and the time information of each of the some historical events are timestamps; and the timestamp of the new event is compared with the timestamp of a latest event in the some historical events stored in the first storage space, and when a time interval between the two is greater than a first threshold and less than a second threshold, it is judged that the new event is a valid event.

In some type of embodiments, the second preset value is 4 or 5 or 6 or 7 or 8.

A denoising method, wherein the denoising method comprises the following steps: (S1) receiving a new event output by an event-driven vision device; (S2) obtaining a data information of the new event, wherein the data information of the new event comprises at least a coordinate information of the new event; (S3) on the basis of a coordinate information of each of some historical events and the coordinate information of the new event, judging whether the new event is a valid event or a noise event, wherein a data information of each of the some historical events is stored in first storage space in a first-in-first-out manner, wherein the data information of each of the some historical events comprises at least the coordinate information of each of the some historical events; wherein on the basis of the coordinate information of each of the some historical events and the coordinate information of the new event, judging whether the new event is a valid event or a noise event specifically comprises the following step: (S301) calculating a respective coordinate distance between the coordinate information of the new event and the coordinate information of each of the some historical events in the first storage space; (S302) judging whether the coordinate distance is within a first preset range, and obtaining a relationship value between the new event and each of the some historical events on the basis of a judgment result; (S303) adding the relationship value between the new event and each of the some historical events together and obtaining a sum of relationship values between the new event and the some historical events, wherein the relationship value between the new event and each of the some historical events is obtained by a first judging module; and according to a magnitude relationship between the sum of the relationship values and a second preset value, judging whether the new event is a valid event or a noise event.

In some type of embodiments, the first storage space is a shift register array, and the data information of each of at least one event of the some historical events is shifted out in a first-in-first-out manner by the shift register array.

In some type of embodiments, after the data information of each of at least one event of the some historical events is shifted out of the shift register array, the data information of the new event is shifted in the shift register array.

In some type of embodiments, the coordinate distance between the coordinate information of the new event and the coordinate information of each of the some historical events in the first storage space is calculated in parallel through addition and/or subtraction.

In some type of embodiments, both the data information of the new event and the data information of each of the some historical events comprise timestamps; and the timestamp of the new event is compared with the timestamp of a latest event in the some historical events stored in the first storage space, and when a time interval between the two is greater than a first threshold and less than a second threshold, it is judged that the new event is a valid event.

In some type of embodiments, the first threshold is between 2 microseconds and 50 microseconds and the second threshold is between 170 microseconds and 400 microseconds.

A denoising device, wherein the denoising device receives some events output by an event-driven vision device, wherein each of the some events comprises at least a coordinate information of each of the some events, and the some events comprise a first event, wherein the denoising device comprises: first storage space configured to, according to a sequence of the some events generated or obtained, store the coordinate information of each of the some events in a first-in-first-out manner; and a first denoising module configured to, according to the coordinate information of the first event and a coordinate information of each of some historical events in the first storage space and/or a coordinate information of each of some subsequent events in the first storage space, calculate at least one coordinate distance between the first event and each of the some historical events and/or each of the some subsequent events; and according to at least one magnitude of the at least one coordinate distance between the first event and each of the some historical events and/or each of the some subsequent events, judging whether the first event is a noise event or a valid event.

In some type of embodiments, the denoising device further comprises: a first judging module configured to judge whether the at least one coordinate distance is within a first preset range, and obtain at least one relationship value between the first event and each of the some historical events and/or each of the some subsequent events on the basis of at least one judgment result; a summing module configured to add the at least one relationship value between the first event and each of the some historical events and/or each of the some subsequent events together and obtain a sum of relationship values between the first event and the some historical events and/or the some subsequent events, wherein the at least one relationship value between the first event and each of the some historical events and/or each of the some subsequent events is obtained by the first judging module; and a second judging module configured to, according to a magnitude relationship between the sum of the relationship values output by the summing module and a second preset value, judge whether the first event is a valid event or a noise event. The second preset value is a preset value configured to differentiate between a noise event and a valid event.

A clustering denoising device, wherein the clustering denoising device receives some events output by an event-driven vision device, wherein each of the some events comprises at least a coordinate information and a time information, and the some events comprise a first event, wherein the clustering denoising device comprises: first storage space configured to store at least the time information of each of the some events; a mapping module configured to, according to the coordinate information of the first event, store at least the time information of the first event in a first storage unit located in the first storage space and corresponding to the coordinate information of the first event; and a clustering operation module configured to, according to the coordinate information of the first event, determine a clustering range of the first event in the first storage space; according to a relationship between the time information of each of some events stored within the clustering range and the time information of the first event, judge whether the first event has a valid clustering relationship with the some events within the clustering range, and if so, judge the first event to be a valid event, and if not, judge the first event to be a noise event.

In some type of embodiments, when at least the time information of each of a part of the some events which is generated later than the first event is stored in the first storage space, according to the relationship between the time information of each of the some events stored within the clustering range and the time information of the first event, whether the first event has a valid clustering relationship with the some events within the clustering range is judged; or before or after at least the time information of the first event is stored in the first storage unit located in the first storage space and corresponding to the coordinate information of the first event, according to the relationship between the time information of each of the some events stored within the clustering range and the time information of the first event, whether the first event has a valid clustering relationship with the some events within the clustering range is judged immediately. or In some type of embodiments, the clustering range of the first event is an address range in the first storage space mapped to an event-driven vision unit that is physically adjacent to an event-driven vision unit that generates the first event in the event-driven vision device.

In some type of embodiments, the clustering operation module comprises a first threshold judgment module and a second threshold judgment module; the first threshold judgment module is configured to, on the basis of the time information of each of the some events, calculate a respective time interval between the first event and each of the some events within the clustering range, compare the time interval that is calculated with a first threshold, and obtain a time relationship value between the first event and each of the some events within the clustering range; and add the time relationship value between the first event and each of the some events within the clustering range together, and obtain a sum of time relationship values of clustering; and the second threshold judgment module is configured to compare the sum of the time relationship values of clustering with the second threshold, and according to a comparison result, judge whether the event is a noise event or a valid event.

In some type of embodiments, the clustering operation module comprises a third threshold judgment module; the third threshold judgment is configured with a third threshold, wherein the third threshold is a time threshold or a frequency threshold; if the third threshold is a time threshold, if an average time interval and/or a maximum time interval of the time interval between the first event and each of the some events within the clustering range is less than the third threshold, the event is judged to be a noise event; if the third threshold is a frequency threshold, if an average frequency and/or a minimum frequency of the frequency between the first event and each of the some events within the clustering range is greater than the third threshold, the event is judged to be a noise event.

In some type of embodiments, the first threshold judgment module is configured to calculate the time relationship value between the first event and each of the some events within the clustering range in parallel; and/or add the time relationship value between the first event and each of the some events within the clustering range together in parallel.

In some type of embodiments, if the time interval is greater than the first threshold, the time relationship value is 0; if the time interval is less than the first threshold, the time relationship value is 1; and if the sum of the time relationship values of clustering is greater than the second threshold, the first event is judged to be a valid event; otherwise, the first event is judged to be a noise event.

A clustering denoising method, wherein the clustering denoising method comprises the following steps: receiving some events output by an event-driven vision device, wherein each of the some events comprises at least a coordinate information and a time information, and the some events comprise a first event; according to the coordinate information of the first event, storing at least the time information of the first event in a first storage unit located in the first storage space and corresponding to the coordinate information of the first event; according to the coordinate information of the first event, determining a clustering range of the first event in the first storage space; and according to a relationship between the time information of each of some events stored within the clustering range and the time information of the first event, judging whether the first event has a valid clustering relationship with the some events within the clustering range, and if so, judging the first event to be a valid event, and if not, judging the first event to be a noise event.

In some type of embodiments, when at least the time information of each of a part of the some events which is generated later than the first event is stored in the first storage space, according to the relationship between the time information of each of the some events stored within the clustering range and the time information of the first event, whether the first event has a valid clustering relationship with the some events within the clustering range is judged; or before or after at least the time information of the first event is stored in the first storage unit located in the first storage space and corresponding to the coordinate information of the first event, according to the relationship between the time information of each of the some events stored within the clustering range and the time information of the first event, whether the first event has a valid clustering relationship with the some events within the clustering range is judged immediately.

In some type of embodiments, the clustering range of the first event is an address range in the first storage space mapped to an event-driven vision unit that is physically adjacent to an event-driven vision unit that generates the first event in the event-driven vision device.

In some type of embodiments, on the basis of the time information of each of the some events, a respective time interval between the first event and each of the some events within the clustering range is calculated, the time interval that is calculated is compared with a first threshold, and a time relationship value between the first event and each of the some events within the clustering range is obtained; the time relationship value between the first event and each of the some events within the clustering range is added together, and a sum of time relationship values of clustering is obtained; and the sum of the time relationship values of clustering is compared with the second threshold, and according to a comparison result, whether the event is a noise event or a valid event is judged.

In some type of embodiments, a third threshold is configured, wherein the third threshold is a time threshold or a frequency threshold; if the third threshold is a time threshold, if an average time interval and/or a maximum time interval of the time interval between the first event and each of the some events within the clustering range is less than the third threshold, the event is judged to be a noise event; if the third threshold is a frequency threshold, if an average frequency and/or a minimum frequency of the frequency between the first event and each of the some events within the clustering range is greater than the third threshold, the event is judged to be a noise event.

In some type of embodiments, the time relationship value between the first event and each of the some events within the clustering range is calculated in parallel; and/or the time relationship value between the first event and each of the some events within the clustering range is added together in parallel.

In some type of embodiments, if the time interval is greater than the first threshold, the time relationship value is 0; if the time interval is less than the first threshold, the time relationship value is 1; and if the sum of the time relationship values of clustering is greater than the second threshold, the first event is judged to be a valid event; otherwise, the first event is judged to be a noise event.

A clustering denoising method, comprising receiving a first event output by an event-driven vision device, wherein the clustering denoising method further comprises: obtaining a data information of the first event, wherein the data information comprises at least a coordinate information, wherein the coordinate information is a location of the first event when the first event is generated in a detection plane of the event-driven vision device; according to the coordinate information, mapping the first event to a corresponding first storage unit in first storage space; determining a clustering range of the first event in the first storage space; classifying some events within the clustering range by a clustering operation, and obtaining at least a valid event set and a noise event set.

In some type of embodiments, K-means clustering and/or means-shift clustering is used in the clustering operation.

In some type of embodiments, an event judged to be a noise event by the second threshold judgment module is generated by random noise and/or hot pixel noise. An event judged to be a noise event by the third threshold judgment module is generated by black noise and/or black block noise.

A denoising device, configured to perform denoising on an output event set output by an event-driven vision device, wherein the output event set comprises an event to be judged, and each event of the output event set comprises at least a coordinate information and a timestamp information, wherein the denoising device comprises: first storage space configured to, according to a sequence of each event generated or obtained, store the coordinate information and the timestamp information of each event of the output event set in a first-in-first-out manner; a time-domain clustering module configured to, according to each timestamp information stored in the first storage space, determine some events each of which has a timestamp difference from the event to be judged being within a preset range and form a first event set; a space-domain clustering module configured to, according to the coordinate information of each event of the first event set and the coordinate information of the event to be judged, determine whether there are events reaching a preset number within the preset coordinate distance range from the event to be judged in the first event set; if so, the event to be judged being a valid event, and if not, the event to be judged being a noise event. The output event set here is a set consisting of some events.

In some type of embodiments, the first storage space is implemented as a shift register.

In some type of embodiments, the event to be judged is a new event to be shifted in the first storage space, or the event to be judged is an event that has a preset depth that the event is shifted to within the first storage space.

In some type of embodiments, according to a difference between the timestamp information of each event of the output event set stored in the first storage space and the timestamp information of the event to be judged, the first event set is determined; or the events in the first storage space are divided to be within different windows and according to a difference between the timestamp information of an earliest generated or obtained event in each of the windows and the timestamp information of the event to be judged, the first event set is determined.

In some type of embodiments, the difference between the timestamp information of each event and the timestamp information of the event to be judged is calculated in parallel.

In some type of embodiments, if the coordinate information of a second event that is of the first event set or is stored in the first storage space is same as the coordinate information of the event to be judged, at least the coordinate information of the second event is deleted. Optionally, the deleted event can continue to be shifted in the first storage space.

In some type of embodiments, the denoising device further comprises second storage space, and according to a size of the preset coordinate distance range of the event to be judged, a number of storage units in the second storage space is determined; and according to the coordinate information of each event of the first event set, each of some events of the first event set is mapped to a storage unit that is in the second storage space and has a corresponding coordinate.

In some type of embodiments, a value of the mapped storage unit that is in the second storage space and has the corresponding coordinate is 1, and the value of the mapped storage unit is not increased when the same mapped storage unit in the second storage space is mapped multiple times; and if no event of the first event set is mapped to a certain storage unit in the second storage space, a value of the certain storage unit is 0. Further, values of all the storage units in the second storage space are summed, and a sum of relationship values is obtained.

In some type of embodiments, the denoising device further comprises a distance relationship value calculating module configured to, according to a distance between the coordinate information of each event of the first event set and the coordinate information of the event to be judged, judge whether each event of the first event set is within the preset coordinate distance range from the event to be judged, if so, a distance relationship value between the event of the first event set and the event to be judged being 1; otherwise, a distance relationship value between the event of the first event set and the event to be judged being 0; the denoising device further comprises a relationship value summing module configured to sum distance relationship values between all of the some events of the first event set and the event to be judged, and obtain a sum of the relationship values; and the denoising device further comprises a noise judging module configured to, according to the sum of the relationship values, judge whether the event to be judged is a noise event.

In some type of embodiments, the timestamp information of a third event comprised in the first storage space and a timestamp information of a newly stored event in the first storage space or a timestamp information of a new event to be shifted in the first storage space are obtained, a timestamp difference between the two is calculated, and if the timestamp difference is less than a preset black noise threshold, at least an event that is generated or obtained after the third event is judged to be a noise event.

In some type of embodiments, the denoising device is implemented in the event-driven vision device, or in an interface circuit between the event-driven vision device and a neuromorphic chip, or in a field-programmable gate array (FPGA).

A denoising method for performing denoising on an output event set output by an event-driven vision device, wherein the output event set comprises an event to be judged, and each event of the output event set comprises at least a coordinate information and a timestamp information, wherein the denoising method comprises the following steps: according to a sequence of each event generated or obtained, storing the coordinate information and the timestamp information of each event of the output event set in a first-in-first-out manner; according to each timestamp information stored in the first storage space, determining some events each of which has a timestamp difference from the event to be judged being within a preset range and forming a first event set; according to the coordinate information of each event of the first event set and the coordinate information of the event to be judged, determining whether there are events reaching a preset number within the preset coordinate distance range from the event to be judged in the first event set; if so, the event to be judged being a valid event, and if not, the event to be judged being a noise event.

In some type of embodiments, the event to be judged is a new event to be shifted in the first storage space, or the event to be judged is an event that has a preset depth that the event is shifted to within the first storage space.

In some type of embodiments, the difference between the timestamp information of each event and the timestamp information of the event to be judged is calculated in parallel.

In some type of embodiments, if the coordinate information of a second event that is of the first event set or is stored in the first storage space is same as the coordinate information of the event to be judged, at least the coordinate information of the second event is deleted. Optionally, the deleted event can continue to be shifted in the first storage space.

In some type of embodiments, the timestamp information of a third event comprised in the first storage space and a timestamp information of a newly stored event in the first storage space or a timestamp information of a new event to be shifted in the first storage space are obtained, a timestamp difference between the two is calculated, and if the timestamp difference is less than a preset black noise threshold, at least the event that is generated or obtained after the third event is judged to be a noise event.

In some type of embodiments, filtered events are used for judging whether there is target object motion, or used for an exposure process of a frame-based camera.

In some type of embodiments, the denoising device is implemented in a dedicated interface circuit or specific interface, implemented as an FPGA circuit, or implemented by a combination of hardware and software. Or the denoising method is implemented in an upper computer through software.

A chip comprising the denoising device of any one of the aforementioned embodiments, or comprising the clustering denoising device of any one of the aforementioned embodiments, or comprising the denoising device of any one of the aforementioned embodiments; or performs the denoising method of any one of the aforementioned embodiments, or performs the clustering denoising method of any one of the aforementioned embodiments, or performs the denoising method of any one of the aforementioned embodiments.

In some type of embodiments, the chip is a neuromorphic chip.

An event-driven vision device comprising the denoising device of any one of the aforementioned embodiments, or comprising the clustering denoising device of any one of the aforementioned embodiments, or comprising the denoising device of any one of the aforementioned embodiments; or performs the denoising method of any one of the aforementioned embodiments, or performs the clustering denoising method of any one of the aforementioned embodiments, or performs the denoising method of any one of the aforementioned embodiments.

An electronic device comprising an event-driven vision device, wherein the electronic device comprises the denoising device of any one of the aforementioned embodiments, or comprises the clustering denoising device of any one of the aforementioned embodiments, or comprises the denoising device of any one of the aforementioned embodiments; or performs the denoising method of any one of the aforementioned embodiments, or performs the clustering denoising method of any one of the aforementioned embodiments, or performs the denoising method of any one of the aforementioned embodiments; to achieve denoising for some events output by the event-driven vision device.

In this disclosure, a part or all of embodiments have the following advantageous technical effects:

1. Outstanding denoising effect: In this disclosure, noise events can be accurately filtered out, and valid events are retained and minimally accidentally damaged.
2. High real-time performance: Because parallel calculation is supported, time complexity is extremely low, and real-time processing of high-speed event stream is supported. Both software and hardware deployment of the solutions can achieve a real-time processing effect.
3. Support for multiple types of noise filtering: In addition to conventional noise and thermal noise, black noise and black block noise can also be filtered out simply and at low cost.
4. Low hardware storage resource consumption: The hardware storage resource consumption also does not increase with an increase in a resolution of an event-driven vision device, thereby further reducing silicon area/silicon cost of a chip.
5. The solutions being easy to be implemented in hardware: In this disclosure, simple addition/subtraction is performed, operations are concise, an iterative operation and complex operations (such as radical sign) that consume a lot of calculation resources are not involved, so the solutions are easy to be implemented in hardware.
6. Amount of calculation being small: Because large-scale data is not involved in the calculation, the calculation is through simple addition/subtraction, and loops/iterations are not needed, the amount of the calculation is small.
7. Low power consumption: Because calculation resource consumption and storage resource consumption are both low, dynamic and static power consumption is low.

More beneficial effects are introduced in preferred implements.

The disclosed solutions/characters above are aimed at generalizing the solutions, characters in the description below. But they may not be the same solution completely. But the solutions disclosed here are also parts of solutions disclosed in this invention. The characters disclosed here, the characters disclosed in description and the contents in the attached figures but not described explicitly are combined reasonably to disclose more solutions.

The solutions combined by the whole characters disclosed in any place of this invention are used for the summary of technical solutions, modification of application files and disclosure of solutions.

DETAILED DESCRIPTION OF EMBODIMENTS

Since we can't depict the whole effective solutions, we will combinate the attached figures to introduce the key contents in the solution of each embodiment clearly and completely. The solutions and details which are not disclosed in the words below are the targets or technical characters that can be implemented by common methods in this field. Due to space limitations, we won't disclose that here.

Unless it means division, the character "/" means "OR" logic in any place of this invention. The descriptions such as "the first", "the second" are used for discrimination, not for the absolute order in spatial or temporal domain, and not indicate that the same terminologies defined by this description and other attributes mustn't refer to the same object.

This invention will disclose the key point for compositing different embodiments, and these key contents constitute different methods and productions. In this invention, even though the key points are only described in methods/productions, it indicates the corresponding productions/methods comprising the same key points explicitly.

The procedure, module or character depicted in any place of this invention, does not indicate it excludes others. The technician of art may get other implements with the help of other methods after reading the disclosed solutions in this invention. Based on the key contents of the implements in this invention, the technician of art can substitute, delete, add, combine, adjust the order of some characters, but get a solution still following the basic idea of this invention. These solutions within the basic idea are also located in the protection field of this invention.

Figure 1:
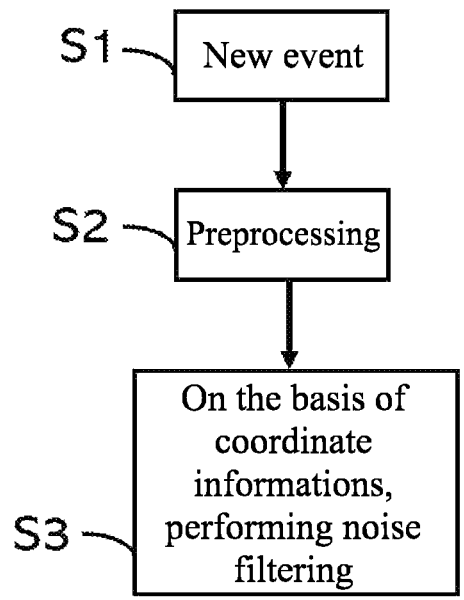
FIG. 1 is a simplified diagram of some type of real-time noise filtering method.

Referring to FIG. 1, FIG. 1 is a simplified diagram of a noise filtering method based on coordinate analysis provided by some embodiments of this disclosure. For noise in events output by an event-driven vision device, the following steps are included:

In step S1, receiving a new event output by an event-driven vision device. The new event (also called a pixel event) may be a noise event, a valid event, or both.

In step S2, obtaining a data information of the new event, wherein the data information of the new event includes at least a coordinate information of the new event.

In step S3, on the basis of a coordinate information of each of some historical events and the coordinate information of the new event, judging whether the new event is a valid event or a noise event. A data information of each of the some historical events is stored in first storage space in a first-in-first-out manner. (For example, a first-in-first-out function is implemented by a shift register array or implemented on a random access memory (RAM) basis.) The data information of each of the some historical events includes at least a coordinate information of each of the some historical events.

Every new event can have a corresponding data information of the new event. The data information can include a coordinate information of the new event that is generated. For example, the coordinate information can include abscissa x (i.e., a coordinate on an x-axis) and ordinate y (i.e., a coordinate on a y-axis) of a pixel, or coordinates with other number of dimensions and of the pixel.

The event-driven vision device, such as a dynamic vision sensor (DVS) or a camera combining a DVS with a traditional frame camera, generates 2D image events that are output in a single-coordinate serial manner. The events output by the event-driven vision device can be dynamically stored by a storage medium. When a new event is input or is ready to be input in the storage medium, an earliest stored/occurring event in the storage medium is output/removed/discarded. In an embodiment, the events output by the DVS can be buffered by a shift register array or stored in another manner. This disclosure does not limit this.

Specifically, in step S1, receiving the new event output by the event-driven vision device specifically includes: configuring a shift register array or a buffer sequence. Because received DVS events are sequentially input, in this disclosure, the shift register array or a pipeline buffer are used. For example, each time a new event of the DVS is received, the new event is stored in an input stage of a buffer. Meanwhile, the original event(s) is sequentially shifted and a first or an earliest occurring event stored in an output stage is output/removed/discarded.

In addition, in some type of embodiments of this disclosure, if an input event is judged to be a noise event, the input event does not need to be discarded, and is shifted in the buffer so that judgement for association with a next incoming event can be performed. In this example, all events are stored in the buffer, and logic is relatively simple. In another type of embodiments, the noise event is discarded and not stored in the buffer. In this example, the noise event is discarded to reduce a probability that the noise event is judged to be a valid event.

Also, in this disclosure, the noise event is not output to a processor/subsequent-stage system (in other words, the noise event is filtered out) so that the subsequent-stage system is prevented from processing the noise event, and system power consumption is further reduced.

Figure 2:
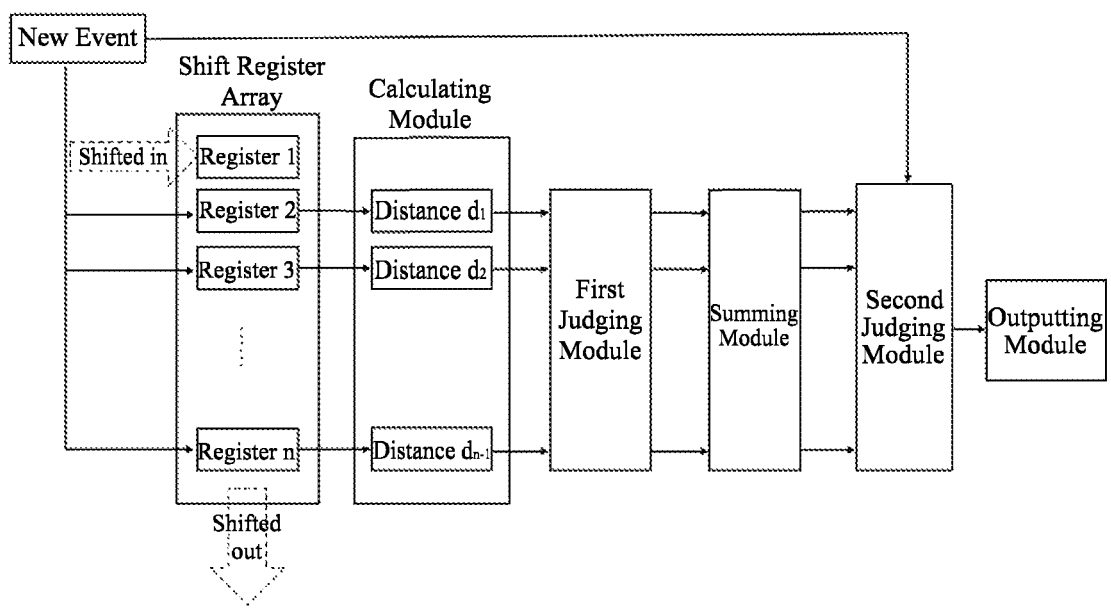
FIG. 2 is a schematic structural diagram of some type of denoising device.
Figure 3:
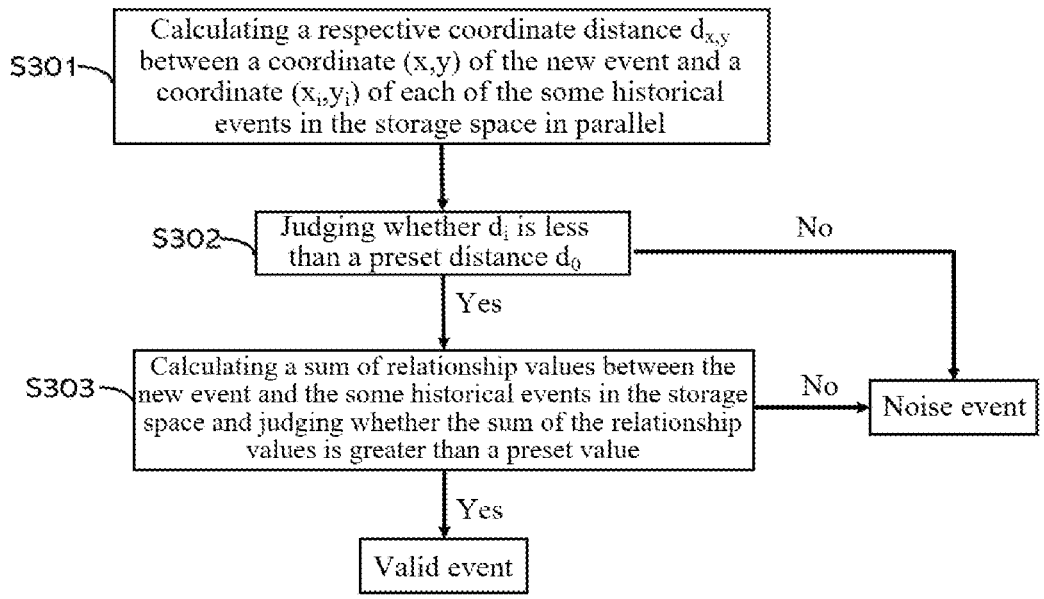
FIG. 3 is a flowchart of some type of denoising method.

For specific embodiments of the steps S2 and S3, refer to the steps in FIG. 2 and/or FIG. 3.

Referring to FIG. 2, a denoising device is disclosed. The denoising device receives a new event output by an event-driven vision device. A data information of the new event includes at least a coordinate information of the new event. The denoising device includes:

First storage space configured to store a data information of each of some historical events in a first-in-first-out manner, wherein the data information of each of the some historical events includes at least a coordinate information of each of the some historical events.

Preferably, the first storage space is a shift register array and receives the new event output by the DVS; and the first storage space preprocesses the new event that is received and obtains a data information of the new event. The data information of the new event includes a coordinate information. The new event is preferably received in real time.

Because DVS events are sequentially input, in an embodiment of this disclosure, a pipeline buffer is used. Each time a new event of the DVS is received, the new event is stored in an input stage of the buffer. Meanwhile, the original event(s) is sequentially shifted and an earliest occurring/generated/stored event(s) stored in an output stage is output/removed/discarded.

A calculating module configured to calculate a respective coordinate distance between the coordinate information of the new event and the coordinate information of each of the some historical events in the first storage space.

Preferably, a coordinate distance $d_{x,y}$ between a coordinate (x, y) of the new event and a coordinate (e.g., some previous events (i.e., historical events) each of which a coordinate is $(x_i, y_i)$) of each of the some previous events stored in the buffer is calculated in parallel through addition and/or subtraction, where i is a positive integer. The some adjacent previous events in the buffer can be a part or all of some events in the buffer. The some adjacent previous events are at least one event buffered in the shift register array.

A first judging module configured to judge whether the coordinate distance is within a first preset range, and obtain a relationship value between the new event and each of the some historical events on the basis of a judgment result.

Preferably, according to the coordinate distance $d_{x,y}$ calculated by the calculating module, it is judged whether $d_{x,y}$ is less than a preset distance $d_0$, for example, $|x-x_i|<d_0$ and $|y-y_i|<d_0$, and a relationship value between the new event and each of the some previous events in the buffer is obtained. In order to increase data processing speed, the first judging module can be configured to judge in parallel. If the distance between the new event and a compared event in the buffer is less than the preset distance, the new event is considered to be a valid event, and the relationship value is 1 (alternatively 2; in principle, any positive number can be used). Otherwise, the event is a noise event, and the relationship value is 0 (alternatively −1; in principle, any non-positive number can be used). The relationship value in this disclosure is a concept of numerically representing proximity between two events on the basis of a coordinate distance between the two events. As mentioned above, preferably, when the distance is greater than a certain range, the relationship value is considered to be zero; otherwise, the relationship value is considered to be a non-zero value. Alternatively, any other pair of values (e.g., 0.01 and 1) reasonably representing proximity can be used for the relationship value between the two events. This disclosure does not limit this.

There are many different ways for calculating and judging the coordinate distance such as $|x-x_i|+|y-y_i|<d_0$, $|x-x_i|<d_0$, or $|y-y_i|<d_0$. This disclosure does not limit the way of calculating and judging the distance. In addition, the relationship value of the valid event and the relationship value of the noise event can also be set to opposite or different values. For example, the relationship value of the valid event is 0 and the relationship value of the noise event is 1. And difference is that subsequent logic judgment needs to be inverted. These are all reasonable alternative ways that can be easily conceived by those skilled in the art, and this disclosure does not limit this. It is easy to predict that logic judgment and numerical assignment of any position in this disclosure can be reasonably configured/changed according to a concept of this disclosure. Such logic judgment and numerical assignment do not depart from the concept of this disclosure, are equivalent to this disclosure, and also belong to the technical solutions claimed by this disclosure.

A summing module configured to add the relationship value between the new event and each of the some historical events together and obtain a sum of relationship values between the new event and the some historical events, wherein the relationship value between the new event and each of the some historical events is obtained by the first judging module.

The some historical events (or buffered events) can be a part or all of the some events in the buffer. Calculating the sum of the relationship values between the new event and the some buffered events means adding the relationship value between the new event and each of some events in the buffer together. The summing module includes a plurality of adders and calculates the sum of the relationship values between the new event and the some buffered events in parallel. Because noise occurs randomly, a sum of relationship values between the noise and some events in the buffer is lesser. But a sum of relationship values between a valid event and the some events in the buffer is greater. Thus, judgment for a noise event and a valid event can be performed.

A second judging module configured to, according to a magnitude relationship between the sum of the relationship values output by the summing module and a second preset value, judge whether the new event is a valid event or a noise event.

Preferably, according to an output of the summing module, whether the sum of the relationship values is greater than the second preset value is judged. If the sum of the relationship values is greater than the second preset value, it is judged that the new event is a valid event; otherwise, it is judged that the new event is a noise event. In order to increase data processing speed, the second judging module can be configured to judge in parallel.

Optionally, the denoising device can further include an outputting module configured to, according to a judgment result of the second judging module, output the valid event.

When the judgment is completed, the valid event is output, but the noise event is not output (i.e., an output is not updated).

In addition, when distance and/or relationship value calculation is performed, a distance between the new event and each of the some events in the buffer can be processed in a sequential (serial) read/write manner. Preferably, the distance calculation and/or relationship value judgment can be performed in parallel. For this type of embodiments, a final judgment result can be obtained more quickly.

This method is implemented in hardware, e.g., in a field-programmable gate array (FPGA), in an application specific integrated circuit (ASIC) (e.g., a dedicated interface circuit or specific interface), or in an integrated circuit (IC) design. A hardware-based real-time noise filtering device obtains a new event and processes the new event that is received in real time. Addition/subtraction that is performed by the noise filtering device is concise, can be implemented easily in hardware, and has low resource occupation and high real-time performance. Thus, output power consumption of the DVS can be effectively reduced.

In some type of alternative embodiments, when an event is judged to be a noise event by the first judging module and/or the second judging module, the event is discarded or filtered out, and an output is not updated. In some type of alternative embodiments, the shift register array includes an input stage buffer configured to buffer a new event or spike that is received. When the event is judged to be a noise event by the first judging module and/or the second judging module, the event in the input stage buffer is discarded or filtered out, that is, not stored into the shift register array or the buffer.

In some preferred embodiments, further, the data information of the event includes time information. The time information includes a time t when the event is generated. Further, t can specifically be a timestamp.

Preferably, the denoising device further includes a band-pass filtering module. The band-pass filtering module is configured to perform band-pass filtering on the basis of a time interval before the new event occurs.

Further, a timestamp of the new event is compared with a timestamp of a latest event in the some historical events stored in the first storage space. When a time interval is greater than a first threshold and less than a second threshold, the new event is considered to be appropriate in time, can pass through band-pass filtering, and is a valid event; otherwise, the new event is a noise event. In some embodiments, in the band-pass filtering solution, a range of the first threshold is between 2 μs and 50 μs, and a range of the second threshold is 170 μs to 400 μs.

Referring to FIG. 3, FIG. 3 is a flowchart of denoising that is for a new event and is based on coordinate analysis in some preferred embodiments of this disclosure. The flowchart includes the following steps:

In step S301, calculating a respective coordinate distance between the coordinate information of the new event and the coordinate information of each of the some historical events in the first storage space. Specifically, a coordinate distance $d_{x,y}$ between a coordinate (x, y) of the new event and a coordinate $(x_i, y_i)$ of each of the some adjacent previous events in the buffer is calculated, where i is a positive integer. The some adjacent previous events are a part or all of the at least one event buffered in the shift register array.

When the coordinate distance is calculated, the distance between the new event and each buffered event can be obtained through simple addition and/or subtraction.

Given that noise events and other events have low correlation therebetween and the noise events are independently distributed, an event of which a coordinate is not within a range of a preset threshold distance $d_0$ is considered to be a noise event. The following steps are used to judge whether the new event is a valid event or a noise event.

In step S302, judging whether the coordinate distance is within a first preset range, and obtaining a relationship value between the new event and each of the some historical events on the basis of a judgment result. The setting of first preset range entails judging whether an event is within a region (with a fixed shape or a dynamic shape) set according to the coordinate of the new event. There is no uniform setting standard for the first preset range. The first preset range can be set according to actual needs. For instance, the range is a numerically optimized range. For example, it is judged whether $d_{x,y}$ is less than a preset threshold distance $d_0$, for example, $|x-x_i|<d_0$ and $|y-y_i|<d_0$, and a relationship value between the new event and each of the some previous events in the buffer is obtained.

If $|x-x_i|<d_0$ and $|y-y_i|<d_0$, that is, when a distance between the new event and a compared event in the buffer is less than the preset distance $d_0$, the new event is considered to be a valid event, the relationship value is 1, and an step S303 is further performed. Otherwise, the event is a noise event, and the relationship value is 0.

A coordinate distance can represent a coordinate relationship. There are many different ways for calculating and judging the coordinate distance such as $|x-x_i|+|y-y_i|<d_0$, and $x-x_i|<d_0$ or $|y-y_i|<d_0$. This disclosure does not limit the way for calculating and judging the distance.

In step S303, adding the relationship value between the new event and each of the some historical events together and obtaining a sum of relationship values between the new event and the some historical events, wherein the relationship value between the new event and each of the some historical events is obtained by a first judging module; and according to a magnitude relationship between the sum of the relationship values and a second preset value, judging whether the new event is a valid event or a noise event, wherein the second preset value is a preset value configured to differentiate between a noise event and a valid event. Specifically, the sum of the relationship values between the new event and the some buffered events is calculated, and whether the sum of the relationship values is greater than the preset value is judged. If the sum of the relationship values is greater than the preset value, it is judged that the new event is a valid event; otherwise, it is judged that the new event is a noise event.

When the judgment is completed, the valid event is output, but the noise event is not output. In other words, when the judgment is completed, the noise event is removed or filtered out.

Further, in some preferred embodiments, in order to further improve an effect of the noise filtering, the aforementioned real-time denoising method further includes an step S4: performing band-pass filtering on the new event on the basis of time information further included by the data information of the event. Both the data information of the new event and the data information of each of the some historical events include timestamps. The timestamp of the new event is compared with the timestamp of a latest event in the some historical events stored in the first storage space. When a time interval between the two is greater than a first threshold and less than a second threshold, it is judged that the new event is a valid event.

When the time information and the coordinate information are combined, low-frequency noise influence can be better filtered out. Thus, joint judgment can also be considered. The step S4 of performing the band-pass filtering on the basis of the time information can be arranged before or after the step S3, or processed at the same time as the step S3. This disclosure does not limit this.

Figure 4:
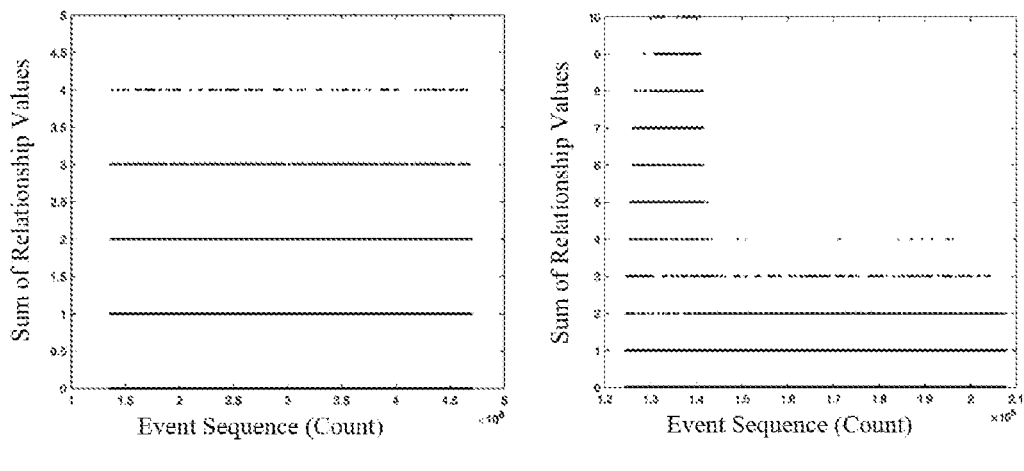
FIG. 4 is a comparison diagram of a sum of relationship values when there is only noise and a sum of relationship values when there is target activation of an object.

FIG. 4 illustrates a difference in a sum of relationship values between a case with target motion and a case without target motion. White noise is taken as an example here. For a certain type of DVS, a left graph of FIG. 4 illustrates a sum of relationship values when there is only noise, and a right graph of FIG. 4 illustrates a sum of relationship values when there are some valid events. In some type of preferred embodiments, the second preset value is 4 or 5 or 6 or 7 or 8.

Figure 5:
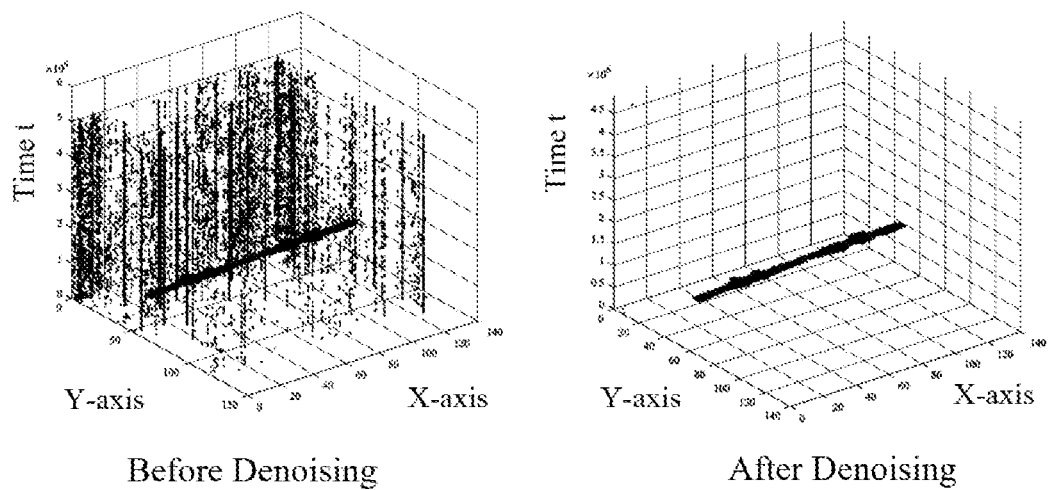
FIG. 5 is a comparison diagram before and after denoising of some type of denoising solution is performed.

FIG. 5 illustrates graphs before and after noise filtering (i.e., denoising) of events generated by the DVS when there is target object motion in some embodiments. Taking 16-stage registers as an example, hardware resource consumption in these embodiments is mainly as follows: the consumption of an input-stage buffer is 26 bits, the consumption of a shift register array is 224=7×2×16 (coordinate length×number of stages) bits, the consumption of registers for operation results are 384=12×2×16 (bit width of an operation register×number of stages) bits, the consumption of a register for result judgment is 32 bits, and the total is 666 bits. Such type of embodiments achieve excellent denoising performance at an extremely low hardware cost.

Figure 6:
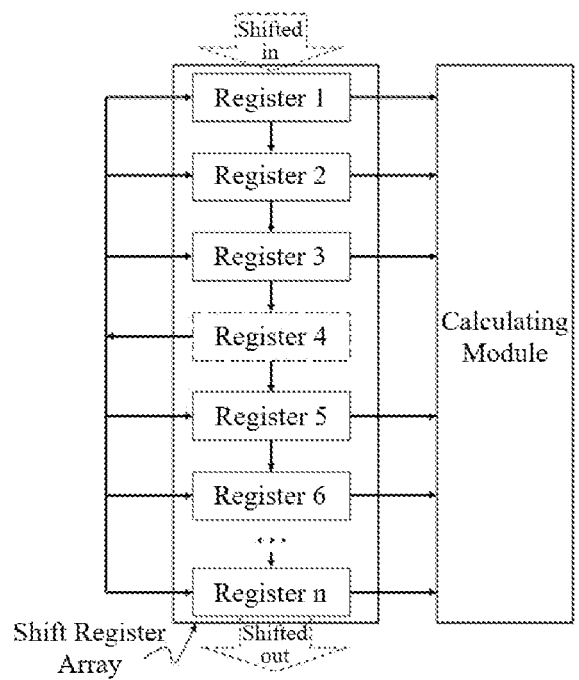
FIG. 6 illustrates more general alternative embodiments of some type of denoising solution.

FIG. 6 illustrates a different data processing method in the shift register array in some preferred embodiments. The solution illustrated in FIG. 6 is similar to the solution illustrated in FIG. 2 but the difference is that in the embodiments in FIG. 6, it is not necessary to judge whether the new event is a noise event or a valid event immediately before or after the new event is shifted in the shift register array. The new event is judged to be a valid event of a noise event after the new event is shifted to a certain depth (e.g., shifted to a register 4 in the figure). An advantage of this is that the solution not only considers a relationship between each of some historical events (the events generated before the new event that are mentioned above and that correspond to registers 5-n) and the "new event" (corresponding to a register 4), but also considers a relationship between each of newer events (corresponding to registers 1-3) and the "new event" (corresponding to the register 4). This prevents the "new event", especially the "new event" generated corresponding to an edge of a moving target, from being misjudged to be a noise event because of an insufficient sum of relationship values.

A special case of the aforementioned embodiments is when a data information of the first event (i.e., the new event) is shifted to a last register (i.e., a register n), only a coordinate distance between a coordinate information of the first event and a coordinate information of each of some subsequent events is calculated. A relationship value is judged on the basis of each of these coordinate distances, a sum of relationship values is calculated, and finally, whether the first event is a noise event or a valid event is judged. Other content of the special case is similar to the aforementioned embodiments and is omitted here.

Figure 7:
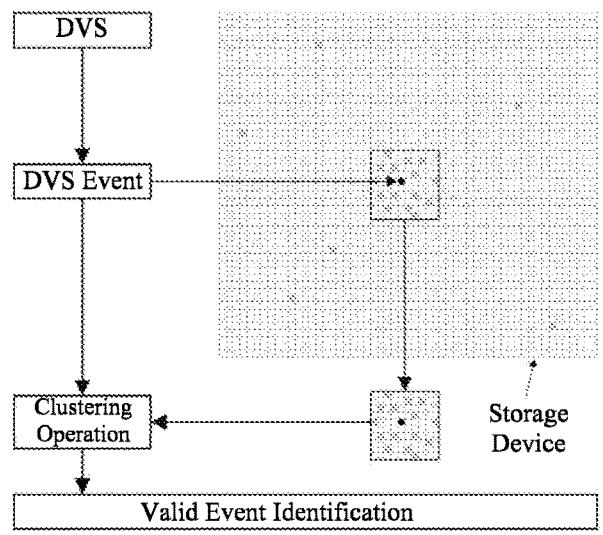
FIG. 7 is a schematic diagram of another type of denoising solution.

Alternatively, in some type of embodiments of this disclosure similarly based on time-domain and space-domain information analysis combined with a judgment principle of a sum of relationship values, as illustrated in FIG. 7, each square in a plane corresponding to a storage device stores a latest event sampled at a corresponding pixel point. A black square is a storage coordinate corresponding to a newly input event. A gray square is an event that has certain event association with the newly input event in space. A specific process is as follows:

In step S10, outputting a first event in real-time by a DVS. Specifically, receiving some events output by an event-driven vision device, wherein each of the some events includes at least a coordinate information and a time information, and the some events include a first event.

The coordinate information includes a location of each of the some events when each of the some events is generated in an N×K detection plane. Coordinates of the DVS detection plane are set in an X-Y coordinate system (e.g., a location where an event occurs is (i, j)), where N and K are positive integers and represent a coordinate range of the DVS, N×K can represent a resolution of the DVS, and i and j are also positive integers.

In step S20, mapping the first event output by the DVS to corresponding storage space. Specifically, according to the coordinate information of the first event, storing at least the time information of the first event in a first storage unit located in the first storage space and corresponding to the coordinate information of the first event.

Figure 8:
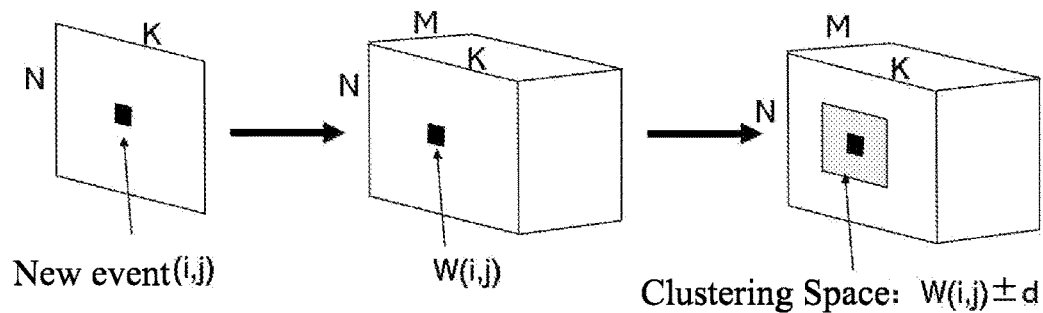
FIG. 8 is a relationship diagram of storage space and clustering space in another type of denoising solution.

The storage space or the storage device is configured to dynamically store an event stream output by the DVS. For example, as illustrated in FIG. 8, there is N×K×M storage space W corresponding to the N×K detection plane of the DVS, where N is an X coordinate range of the DVS, K is a Y coordinate range of the DVS, and M corresponds to a size of a storage area needed by a data information of a DVS event (i.e., a data information of each event has M bits or bit width of a timestamp). N, K, and M can be adjusted as required, and are all positive integers. The storage space stores some event informations therein, which are sometimes referred to as some events stored in the storage space. The storage space can be spatially ordered registers, a RAM storage unit, disk storage space, or the like.

As events generated by the DVS are continuously received, the event stream will be completely distributed in the W space. So it is inevitable that a storage location W(i, j) corresponding to the first event E retains an information of an event that occurs before the first event. Data of the previous event can be overwritten with data of the first event E. That is, each time a first event E is newly stored, original data of an event at the address is overwritten. Thus, it is ensured that an event stored in each storage location W(i, j) is a latest event occurred or collected at the area.

Thus, for the event stream output by the DVS stored sequentially by the storage device in the W space, each storage location (unit) stores a latest event collected at the pixel point.

In step S30, analyzing event properties and performing clustering judgment. Specifically, according to the coordinate information of the first event, determining a clustering range of the first event in the first storage space; according to a relationship between the time information of each of some events stored within the clustering range and the time information of the first event, judging whether the first event has a valid clustering relationship with the some events within the clustering range, and if so, judging the first event to be a valid event, and if not, judging the first event to be a noise event.

Dynamic events detected by the DVS are usually triggered by an edge area of a moving object. Because an edge has larger intensity gradients and has stronger correlation in space and time, valid events are usually points distributed in a concentrated or continuous manner in space. Noise events are often randomly generated. Noise accompanying DVS imaging includes random noise, hot pixel noise, black block noise, black noise, or the like.

Ordinary noise events, such as random noise and/or hot pixel noise, are often distributed in a discrete manner in space and/or time, and appear as separate and discrete points. Any one of the ordinary noise events has weaker correlation with other events, has a small spatial clustering set, and can be easily differentiated from a real event.

Special noise events, such as black block noise and/or black noise, are distributed in an indiscrete manner in space and/or time, and have certain temporal and/or spatial correlation. Ordinary denoising methods or clustering methods are not enough to deal with the special noise events. In order to further enhance a denoising effect, such type of noise is filtered out in this disclosure. Clustering is performed for the area in combination with a characteristic of occurrence frequency of events in the area to differentiate between a valid event and a noise event.

Figure 9:
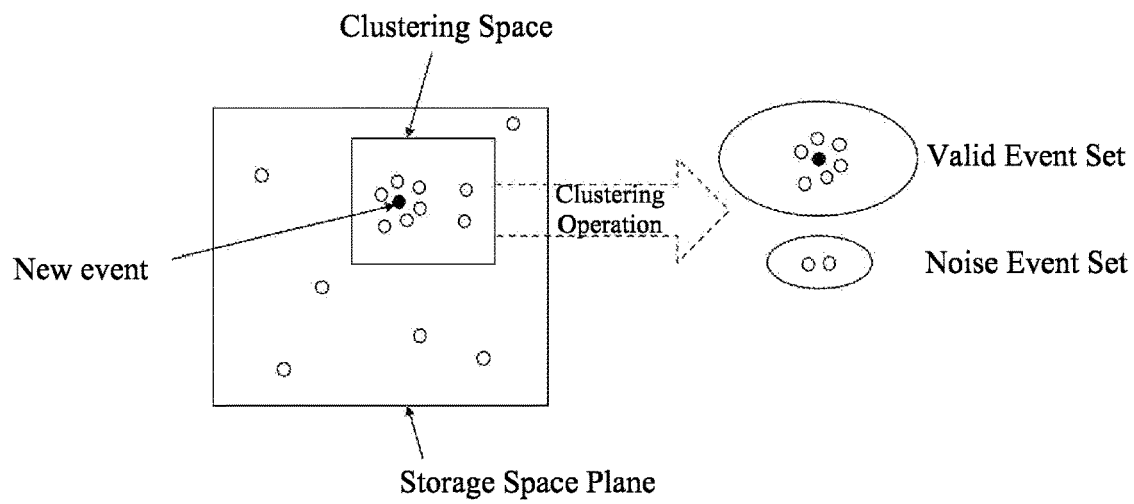
FIG. 9 is a schematic diagram of a clustering operation in another type of denoising solution.

Further, in this disclosure, a noise event is distinguished from a valid event by clustering. As illustrated in FIG. 9, clustered events are divided into a plurality of subsets by analysis of a clustering operation. The clustered events are at least classified into a valid event set and a noise event set. Data in each of the subsets has a high degree of intrinsic similarity. K-means clustering or means-shift clustering can be used in the clustering operation to achieve effective real-time classification.

In addition, in a DVS real-time denoising process, for each newly generated event, a clustering relationship between each newly generated event and each of some events within a clustering space range in the storage space W is judged by the clustering operation. According to the clustering relationship, it is judged whether each newly generated event is noise or an event. Specific steps are as follows:

In step S31, determining a clustering space range.

On the basis of a property of an input event, a clustering space range is determined. For example, according to a coordinate (i, j) of an input event, a coordinate range associated with the input event in a storage space W can be determined. For example, the range is W(i, j)+d or W(i±d, j±d).

In addition, the associated coordinate range in the storage space W can also have another representation range such as the coordinate range having a rectangular shape, a circular shape, or another shape. This disclosure does not limit this.

In step S32, performing clustering analysis to filter out ordinary noise.

In the storage space W, some events within an address range (i.e., clustering range) associated with a storage unit corresponding to a first event are clustered. By a clustering operation, it can be judged whether the event has a valid clustering relationship with the some events within the clustering range. According to the clustering relationship, it can be judged whether the event is a noise event or a valid event.

The clustering judgment is easily implemented in hardware, and can use FPGA, ASIC (e.g., a dedicated interface circuit or specific interface), or an IC design. Calculation and judgement involved in the clustering judgement are both processed in parallel. Parallel processing is faster, has stronger real-time performance, and prevents some accumulation operations executed when software performs denoising processing from increasing delay and power consumption.

Preferably, the clustering judgement is performed using a threshold to judge whether the first event is a valid event or a noise event.

Preferably, in the storage space, a timestamp of each pixel point within the clustering range can be obtained by accessing an adjacent address.

According to the aforementioned steps, an information of the first event and an information of each of the some events within the clustering range of the first event can be obtained, wherein each information includes at least a time information. By the clustering operation, it can be judged whether the event is a noise event or a valid event.

Here, a clustering operation solution performed in hardware is briefly introduced. The solution is implemented in hardware.

A data information of a first event E generated by a DVS is set as: a coordinate (i, j), a timestamp T(i,j), a clustering range [(i−8, j−8), (i−8, j−8+1), . . . , (i+8, j+8)]. A value representing a relationship in time (referred to as a time relationship value) between the first event E(i, j) and a certain event E(k,p) within the coordinate range is set as value(k,p). A timestamp of the event E(k,p) is set as T(k,p).

Aforementioned settings have achieved spatial selection. On the basis of a need to simplify the operation, only some time differences are considered here to simplify the operation. That is, a time interval (or a time difference) dT(k,p) between the first event E(i, j) and each event E(k, p) within the clustering range is calculated:

$$dT(k,p)=T(k,p)-T(i,j);$$

A first threshold T1 is set. The time interval dT is compared with the first threshold T1, and a time relationship value between the first event E(i, j) and any event E(k, p) within the clustering range is obtained. In some type of embodiments, the first relationship value is 1, and the second relationship value is 0.

When dT<T1, value(k, p)=1 (the first relationship value), which means that the first event E(i, j) is temporally related to the certain event E(k,p) within the clustering range. When dT>T1, value(k, p)=0 (the second relationship value), which means that the two are not temporally related.

A time relationship value in this disclosure numerically represents a time relationship between two events on the basis of a time interval between the two events. In other embodiments, the relationship value can be another value. For example, the first relationship value can be 2 or any positive integer. The second relationship value can be −1 or any non-positive integer. As mentioned above, preferably, when the time interval is greater than a certain range, the relationship value is considered to be zero; otherwise, the relationship value is considered to be a non-zero value.

Alternatively, any other pair of values (e.g., 0.01 and 1) reasonably representing proximity can be used for time relationship values of the two events. The relationship values can also be set to opposite values. For example, the relationship value of the valid event is 0 and the relationship value of the noise event is 1 or −1. This disclosure does not limit this.

It is easy to predict that logic judgment and numerical assignment of at least this position in this disclosure can be reasonably configured/adjusted according to a concept of this disclosure to meet logical requirements for solving a denoising problem. Such variation of logic judgment and numerical assignment do not depart from the concept of this disclosure, are equivalent to this disclosure, and also belong to the technical solutions claimed by this disclosure.

The time relationship value between the first event and any one of the some events within the clustering range is added together, and a sum of time relationship values of clustering Value$_{total}$ is obtained. The sum of the time relationship values of clustering is:

$$\text{Value}_{total}=\Sigma_{k=i-8}^{k=i+8}\Sigma_{q=j-8}^{q=j+8}\text{value}(k,q)$$

In some type of embodiments, a time relationship between the first event and each of the some events within the clustering range can be processed in a sequential (serial) read/write manner.

It is taken as an example that the first relationship value is 1 and the second relationship value is 0. A second threshold is configured for the sum of the time relationship values of clustering Value$_{total}$. When Value total is greater than the second threshold, the first event and the some events within the clustering range are considered to have a valid clustering relationship and to have strong correlation, and can be considered to belong to a same event set, i.e., a dynamic behavior; when Value$_{total}$ is less than the second threshold, the first event and the some events within the clustering range are considered not to have a valid clustering relationship and to have weak correlation, and can be considered not to belong to a same event set, i.e., a non-dynamic behavior, and can be considered to be noise. Accordingly, it is possible to identify real events and filter out noise.

In order to increase data processing speed, the relationship values and/or the sum of the time relationship values of clustering can be configured to be calculated in parallel. That is, the time relationship between the first event E(i, j) and each of the some events within the clustering range is calculated in parallel and/or the sum of the time relationship values is calculated and judged in parallel.

Thus, calculation and judgement involved in a process of judging whether the event is a noise event or a valid event using the first threshold and the second threshold can both be processed in parallel (only through addition and/or subtraction). Parallel processing is implemented in hardware and has low resource occupation. Thus, output power consumption of the DVS can be effectively reduced.

Further, this disclosure further includes an step S33: filtering out special noise.

Figure 10:
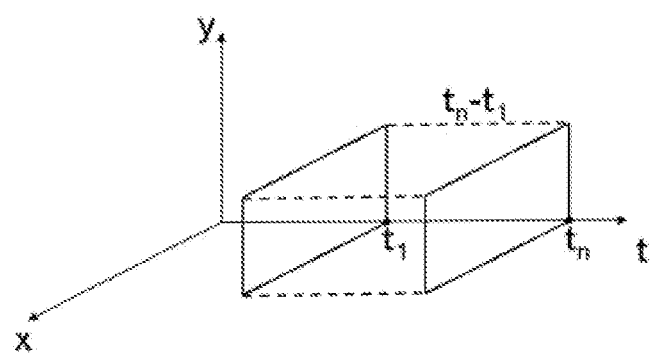
FIG. 10 is a schematic diagram of time-domain clustering in another type of denoising solution.

For the some events within the associated coordinate range in the storage space W (the some events within clustering space), according to a time information of an occurrence of each of these some events, it is further judged whether it is noise. As illustrated in FIG. 10, some time-stamp informations of the some events within the clustering space are concentrated in a period from $t_1$ to $t_n$. An average time interval or a maximum time interval of some occurrences of these some events is calculated. Because frequency of noise events of a black block noise type or a black noise type is extremely high, and is often greater than frequency of generating events, this type of special noise can be avoided by rejection.

Preferably, a third threshold is configured. The third threshold is a time threshold or a frequency threshold. When the third threshold is a time threshold, if at least one time interval (the average time interval and/or the maximum time interval) of all of the some events within the clustering space range is less than the third threshold, the event is considered to be a noise event; otherwise, the event is considered to be a valid event. When the third threshold is a frequency threshold, if an average frequency and/or a minimum frequency of all of the some events within the clustering range is greater than the third threshold, the event is considered to be a noise event; otherwise, the event is considered to be a valid event.

In this disclosure, according to temporal and/or spatial correlation of noise events, noise is divided into ordinary noise events (random noise, hot pixel) and special noise events (black block noise, black noise). According to the step S32, an ordinary noise event is filtered out. According to the step S33, a special noise event is filtered out. When the two are combined, noise influence can be better filtered out. Thus, joint judgment can also be considered. The step S33 of performing denoising for special noise can be arranged before or after the step S32, or processed in parallel with and at the same time as the step S32. This disclosure does not limit this.

Figure 11:
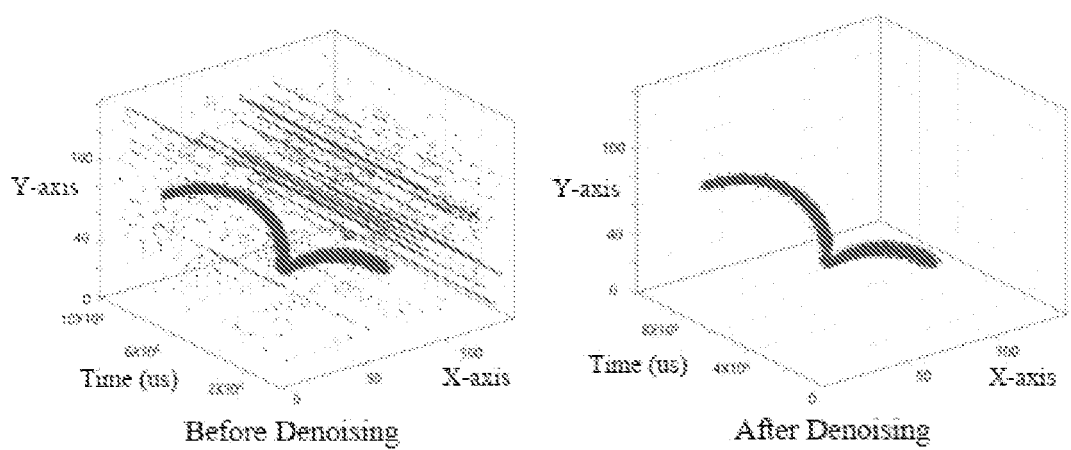
FIG. 11 is a comparison diagram before and after denoising of another type of denoising solution is performed.

When real-time clustering denoising technology of this disclosure is performed, the sum of the time relationship values being 6 is used as a judgement basis (i.e., the second threshold is set to 6). FIG. 11 illustrates an event graph (including noise events and valid events) before denoising and after denoising, wherein the DVS is activated before denoising. It can be seen from the graphs that noise events can be effectively filtered out by the real-time clustering denoising technology of this disclosure. Disturbance of noise events is almost non-existent, a motion trajectory is clearly visible without loss, and thickness of the entire motion trajectory is basically same, which intuitively indicates that a denoising process minimally damages the valid events and a denoising effect is good. Thus, in this disclosure, a variety of noise is filtered out under a condition of ensuring accuracy. The valid events are maximally retained and minimally damaged.

This type of embodiments have excellent denoising performance but occupies larger storage space (but consumption of these storage resources is acceptable in most cases). This type of embodiments are more suitable to be implemented in software than in hardware.

Alternatively, this disclosure further discloses more preferred embodiments based on time-domain and space-domain information analysis combined with a judgment principle of a sum of relationship values and fully combining an advantage of low resource occupation of some aforementioned embodiments and an advantage of good denoising performance of some aforementioned embodiments.

Figure 12:
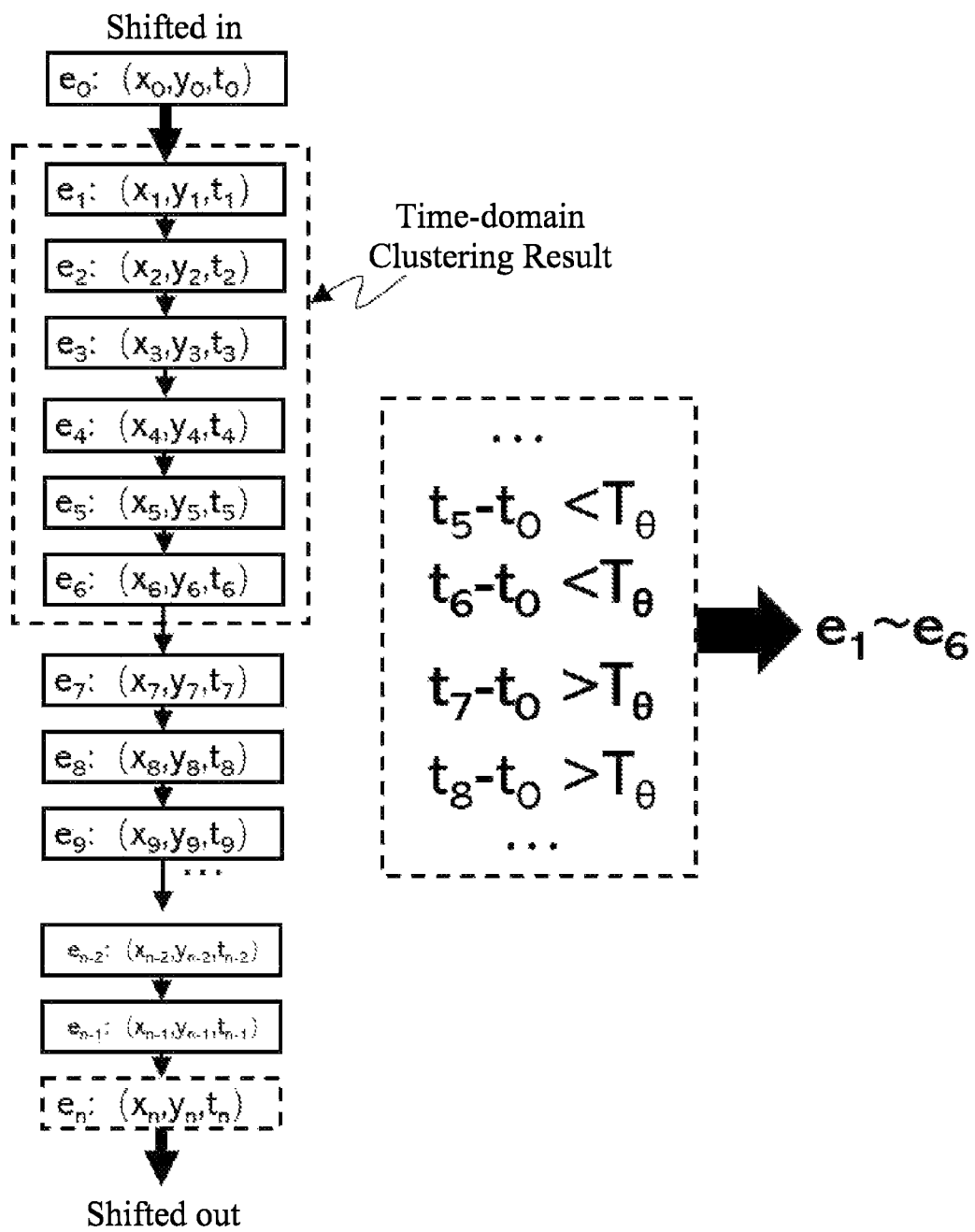
FIG. 12 is a schematic diagram of time-domain clustering in still another type of denoising solution.

The noise filtering scheme of the present invention includes a time-domain part and a spatial-domain part. The device scheme and corresponding method scheme are described jointly. Refer to FIG. 12, it shows the time-domain filtering part of the noise filtering scheme of present invention. The time-domain filtering part includes a first storage space, preferably implemented with a shift register, or it can be implemented with a RAM memory following a first-in-first-out principle, the present invention is not limited to this.

Event imaging device, such as a dynamic vision sensor (DVS), generates a sequence of spike events (or events for short) caused by noise interference and/or moving targets. The set of these output events, which are generated by event imaging units in the event imaging device, usually include coordinate information (or position information), e.g., x-axis and y-axis, time stamp information when the event is generated, and other information, e.g., polarity information.

New event $e_0$ (event to be judged) is the latest event generated by the event imaging device, its coordinate is ($x_0$, $y_0$) and its time stamp is to. A first storage space includes several storage units and is used to store at least coordinate information and time stamp information of these events. For example, the first storage space has n storage units, which stores the coordinate information and time stamp information of each event $e_1$~$e_n$, each storage unit stores the coordinate information and time stamp information of an event, wherein n is a positive integer. For example, the information stored in the first storage space of the event $e_n$ is ($x_n$, $y_n$, $t_n$), where ($x_n$, $y_n$) is the coordinate information of the event and $t_n$ is the time stamp information corresponds to the n-th storage unit. Although the first storage space is only used to store at least the time stamp information and coordinate information of the event, for simplicity of description, in the present invention, each of the storage unit in the first storage space can be regarded as event with corresponding time stamp and coordinate information. For example, a new event is an event to be moved into the first storage space.

The first storage space follows a first-in-first-out storage principle. For example, remove the information in a storage unit storing the $e_n$ coordinate information and time stamp information, and then write the coordinate information and time stamp information of the event $e_n-1$ into the storage unit that previously stored the $e_n$ coordinate information and time stamp information. Similarly, write the coordinate information and time stamp information of event $e_1$ into the storage unit that previously stored the $e_2$ coordinate information and time stamp information, and write the coordinate information and time stamp information of new event $e_0$ into the storage unit that previously stored the $e_1$ coordinate information and time stamp information. In other words, according to the order of events being generated (time stamp) or according to the order of events being acquired by the first storage space, the coordinate information and time stamp information of events are sequentially stored in each storage unit of the first storage space. Certainly, the information stored in each storage unit may not be limited to coordinate information and time stamp information.

In addition, the first storage space in the present invention can be a continuous storage space or a plurality of separate sub-storage spaces. For example, the coordinate information and the time stamp information can be stored separately, the present invention does not limit the implementation of first storage space.

The denoising device includes a time-domain clustering module, which identifies a first event set of undetermined events according to a first time threshold $T_0$. Specifically, for the events stored in the first storage space, determine the magnitude relationship between the difference of each of the time stamp information $(t_1, t_2, t_3, \ldots, t_n)$ relative to the new event $t_0$ and the first time threshold, and then find an event with the oldest generation time while the difference of time stamp information between that event and the new event $t_0$ is less than a first time threshold (for example, 20 milliseconds). Refer to FIG. 1, event $e_6$ in this example is an event that meets this condition, and the first event set is determined to be $e_1$~$e_6$.

There can be many ways to determine the first event set. For example, according to the occurrence order of events from $e_1$ to $e_n$, calculate the magnitude of difference between the time stamp of each event and t0 one by one, and the magnitude is compared with the first time threshold. The first event set can be determined if the magnitude comparison is reversed for the first time. Of course, the judgment can also be performed in a reverse order, for example, according to the order of occurrence of events $e_n$~$e_1$.

Alternatively, some judgements can rely on "forward-reverse" method, which can be achieved through a greedy algorithm (if the magnitude comparison remains the same, the step size is doubled and forward, otherwise it is reversed. For example, a search order is $e_1$-$e_2$-$e_4$-$e_8$-$e_{16}$-$e_{12}$-$e_{14}$-$e_{13}$). The searching is keep forwarding to the place where the magnitude comparison is reversed, which is more efficient when the size of the first storage space is large.

Alternatively, one can also use dichotomy to judge directly from the middle position. When n is an even number, the middle position is n/2, and when n is an odd number, the middle position is (n+1)/2 or (n−1)/2, and then gradually reduce the search space until the magnitude comparison is reversed.

Alternatively, after parallelly judging all the magnitude comparisons, search for the first reversion of magnitude comparison to determine the first event set. Any reasonable schemes to determine the first set of events are applicable, the present invention is not limited to this.

Figure 13:
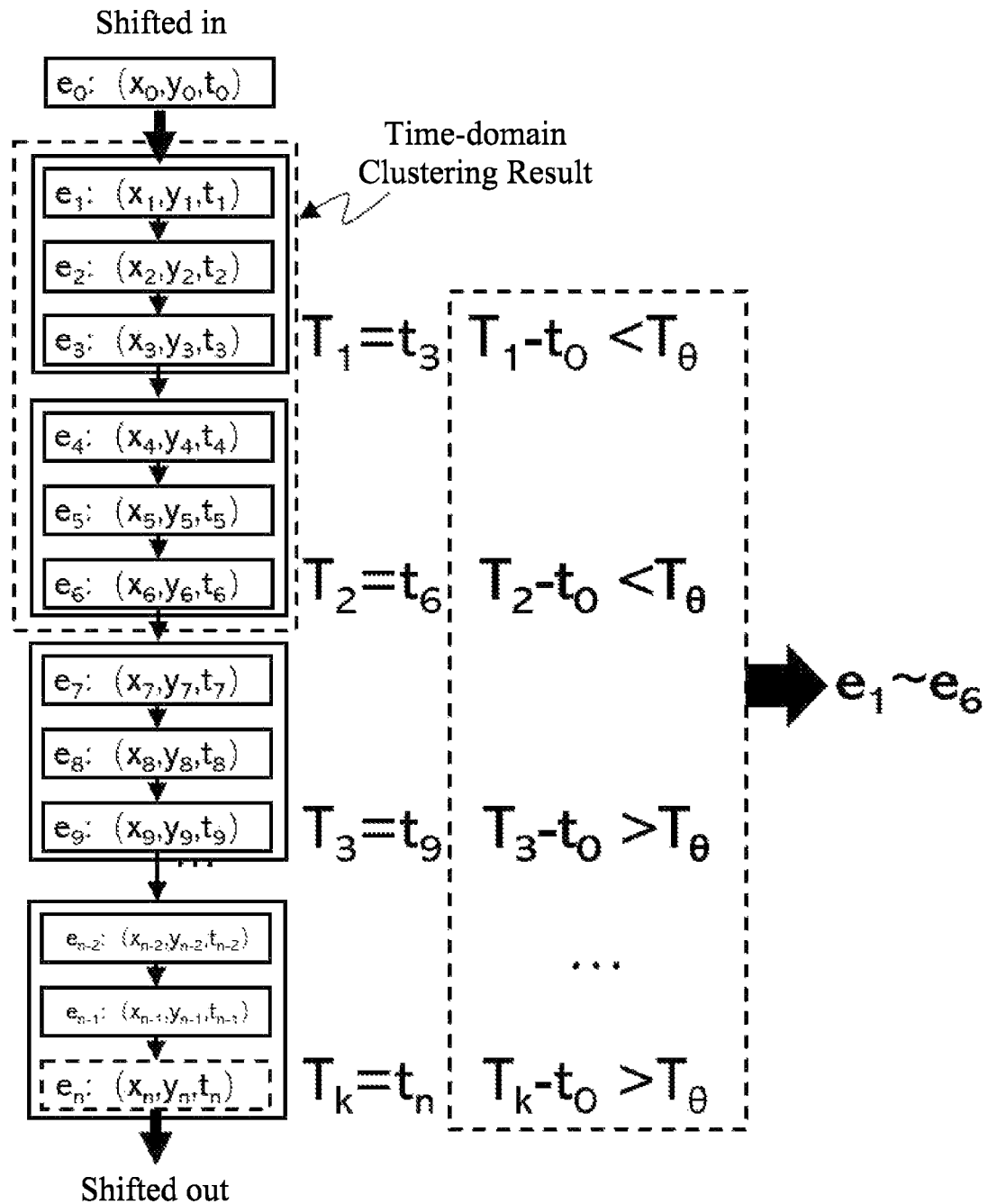
FIG. 13 is a schematic diagram of another time-domain clustering in still another type of denoising solution.

The first event set is a time-domain clustering result, which is a subset of all events stored in the first storage space. In the second type embodiment shown in FIG. 13, the first event set can also be determined by window division. The advantage of window division is that it reduces number of calculations required in aforementioned magnitude comparison. Besides, the method of window division has high flexibility. For example, for the case of slow motion, each window can be set to be shorter, and for the case of fast motion, each window can be set to be longer. A window can be divided according to a fixed number of storage units (3 storage units in one window as shown in FIG. 2), or can be divided into several windows, each with different number of events. That is, it can be determined according to an actual condition.

The time stamp of the last event of each window $(t_3, t_6, t_9, \ldots, t_n$, n is a positive integer) can be set as the time stamp of the window $(T_1, T_2, T_3, \ldots, T_k$, k is a positive integer). Calculate the difference between each time stamp in corresponding window and $t_0$, and then compare the magnitude with the first time threshold $T_0$. The first event set can be determined when the aforementioned magnitude comparison is reversed for the first time. For example, if $T_2-t_0<T_\theta$ and $T_3-t_0>T_\theta$, then the events $(e_1$~$e_6)$ in the first two windows constitute the first event set. The number of events determined in the first event set of this embodiment may not be exactly the same as that determined in the previous embodiment, because after the window is divided, the granularity becomes coarser. However, the deviation of the number of events will not exceed the number of events contained in a window. The advantage of this embodiment is the reduction of calculations.

Further, the difference between the time stamp and t0 of each window can be calculated in series (in forward or reverse order) and/or in parallel, and the first event set can be determined where the magnitude relationship is reversed for the first time.

Figure 14:
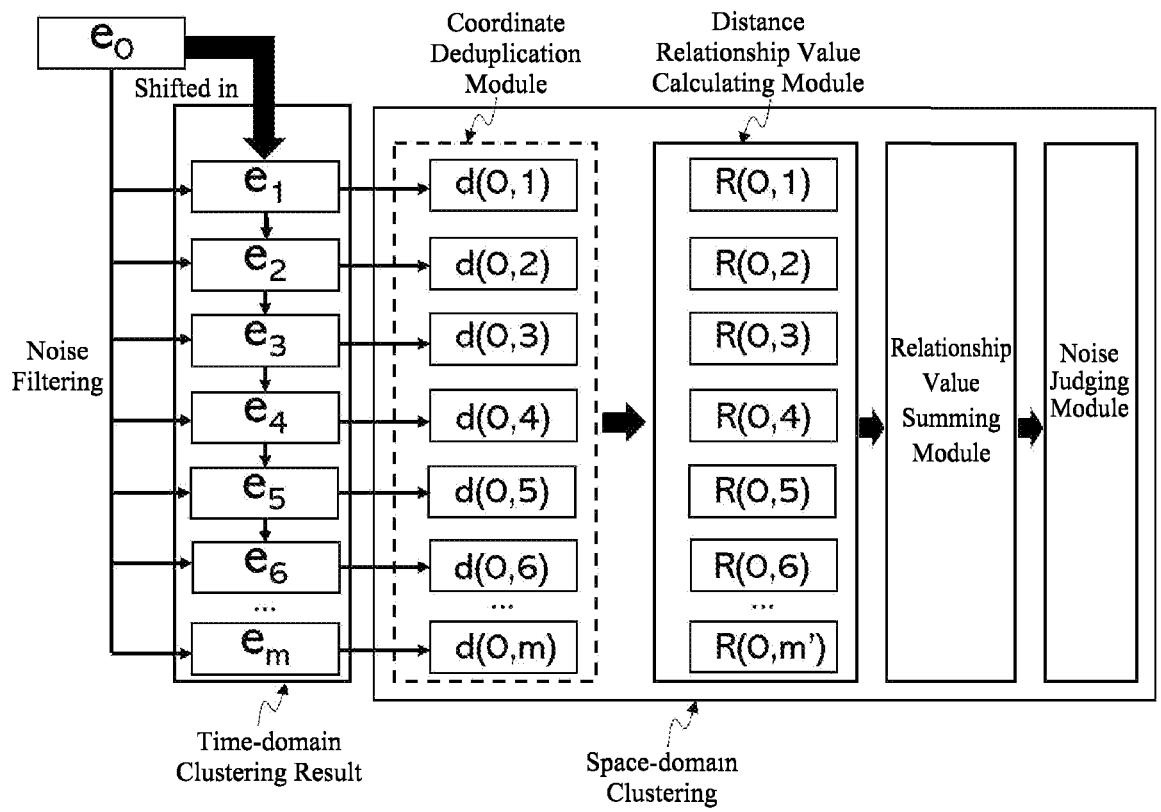
FIG. 14 is a structural diagram of space-domain clustering in still another type of denoising solution.

Refer to FIG. 14, the first event set (not all events in the first storage space) is adopted as a time-domain clustering result, which is a basis for subsequent spatial-domain clustering. In a certain type of embodiments, spatial-domain clustering is generated based on the coordinate information of a new event e0 and the coordinate information of each event $(e_1$~$e_m)$ in the first event set, and then finally determine whether the new event is a noise event or a valid event.

Figure 15:
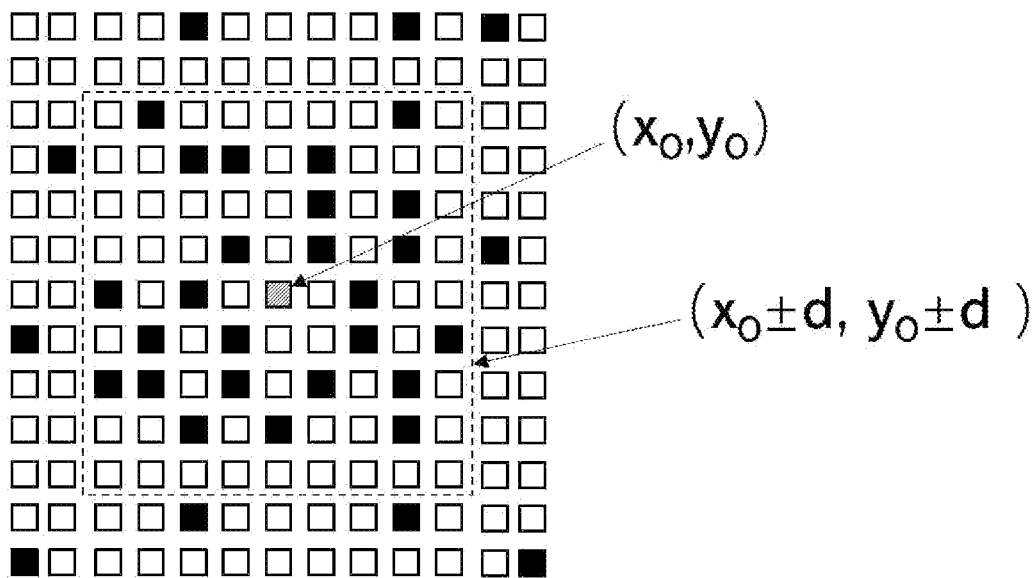
FIG. 15 is a schematic diagram of clustering space in still another type of denoising solution.

Refer to FIG. 15, the coordinate of a new event $e_0$ is $(x_0, y_0)$. From the perspective of spatial-domain, if there are events occur within a certain range around the new event, such as $(x_0 \pm d, y_0 \pm d)$, then these events and the new event belong to the same clustering event. The same clustering event, for example, is logically considered that these events belong to the changes of event imaging units within a certain area triggered by a certain target object. The value of d is a real number. Of course, the certain area defined here can be set according to an actual application. They can be set in many ways, such as rectangle, circle, etc., and the present invention is not limited to this.

Continue to refer to FIG. 14, in order to realize spatial-domain clustering judgment, in a certain type of embodiments in the present invention, a distance relationship value $R(e_0, e_i)$ can be adopted in the distance relationship value calculation module to reduce the dimensionality of the information. Illustratively, in a preferred embodiment, it can be mathematically described as follows:

$$R(e_0, e_i) = \begin{cases} 1 & d(e_0, e_i) \le d \\ 0 & d(e_0, e_i) > d \end{cases}$$

where R ($e_0$, $e_i$) (in short as R(0,i)) represents the value of the distance relationship between the new event $e_0$ and the event $e_i$, if the distance between the coordinate information ($x_0$, $y_0$) of the new event $e_0$ and the coordinate information ($x_i$, $y_i$) of the event $e_i$, $d(e_0,e_i)$, (in short as d(0,i)) is within a certain set distance d, then the distance relationship value is set to 1, otherwise the distance relationship value is set to 0, wherein i is a positive integer and d is a first threshold, such as d=8.

Obviously, the definition of the distance relationship value can be various. For example, the value does not need to be 1 and 0, can also be 2 and 0, 1 and 0.01, −1 and 0, 1 and −1, etc. Different definitions may lead to logical adjustments or even logical reversals in determining whether an event is a noise event, but these logical adaptations are common to those skilled in the art, and the present invention is not limited to this.

In addition, the definition of $d(e_0, e_i) \le d$ can also be various. For example, in some preferred embodiments, it can be defined as: $|x_0-x_i|+|y_0-y_i| \le d$, or $|x_0-x_i| \le d$ and $|y_0-y_i| \le d$. In fact, any quantitative method that can characterize the distance between the new event $e_0$ and the event $e_i$ can be used for the calculation of distance relationship value between the new event $e_0$ and the event $e_i$, and the present invention is not limited to these examples. As for whether the boundary logic of "≤" or "<" is used when comparing the magnitude with the first threshold d, it can also be done according to certain criteria, which lead to different embodiments, and the present invention is also not limited to this.

The relationship value summation module sums the distance relationship values between all events in the first event set and the new event in order to derive a total relationship value Rs. Based on the comparison result of the sum of the relationship values Rs and a second threshold, the noise judgment module judges whether a new event is a noise event or a valid event. For example, in the foregoing embodiment where the distance relationship values are 1 and 0, if the total relationship value Rs is less than (or ≤) the second threshold, the new event is considered as a noise event, otherwise the new event is considered as a valid event. In other words, if it is judged that the new event and the events in the first event set form a cluster of valid events, the event is considered as a valid event, otherwise it is a noise event.

For some hot pixels, the fire frequency is extremely high (thousands to tens of thousands of hertz). The characteristic is that in a short period of time, the same hot pixel location will generate many noise events. This may result in a large number of hot pixel events happen in the first event set (and even the first storage space). Therefore, in a preferred embodiment, a coordinate deduplication module is provided. The coordinate deduplication module deduplicates events in the first event set. That is, to deduplicate events with the same coordinate information. In the present invention, the means or meaning of deduplication can be to retain only one event in the output event set with the same coordinate information, or to directly filter out all events with the same coordinate information.

For the number of events in the first event set is an integer m, in certain embodiment, the x-coordinate distance and y-coordinate distance between the new event and each of the events in the first event set can be calculated first, if each of the x-coordinate distance and the y-coordinate distance are the same, then they are the events firing by the same event imaging units. Of course, it is also possible to filter out the event directly after comparing the coordinate values of the events, and it is also possible to set a third threshold to deduplicate events when the number of same events is greater than the third threshold. Set the number of events being filtered as an integer m', where m'≤m.

Aforementioned simple deduplication scheme is to deduplicate events after one-by-one comparisons according to the coordinate information of the events, and the integer value m is generally not too big. However, the time complexity order of the scheme is up to $o(m^2)$, which leads to an impact on real-time performance, thereby there is still room for further improvement.

In order to improve the time efficiency of deduplication. In certain preferred embodiment, after calculating the x-coordinate distance and y-coordinate distance between the new event $e_0$ and each of the events ($e_1$~$e_m$) in the first event set, if a certain second event (there can be more than one, for example, the coordinate information of $e_2$) is exactly equal to the coordinate information of the new event $e_0$, for example, the calculated difference between the horizontal and vertical coordinates of the new event $e_0$ and event $e_2$ is diff($e_0,e_2$)=(0,0), then the event $e_2$ is likely to be a hot pixel noise event, and therefore being judged as the hot pixel noise event. Of course, the events under distance calculation may not be limited to the first event set, the target events for distance calculation with respect to the new event can be part or all of the events in the first storage space. As far as the hardware is concerned, the calculation can be preferably performed in parallel, which corresponds to a time complexity order of o(1).

For the determination of hot pixel noise event, different solutions can be adopted. In a preferred embodiment, at least the hot pixel noise events in the first event set or in the first storage space can be cleared. The means or meaning of clearing in the present invention may be to modify at least the coordinate information and/or the time stamp of the hot pixel noise event in the first storage space to some abnormal values or non-regular values. For example, if the pixel coordinate range of the DVS is within [0~127, 0~127], then the coordinates of the aforementioned event e2 can be modified to (129, 129) or (−1, −1), etc. Optionally, the modified noise event continues to be processed in the subsequent event shift operation in the first storage space. In this case, the subsequent calculation of the distance relationship value and the summation of the relationship value, for example, can be one of the following:

1. For the coordinate distance where the x-coordinate distance and the y-coordinate distance are both 0 after the calculation, modify the values to the x-coordinate distance and the y-coordinate distance that make the distance relationship value reversed. For example, in the previous example, for diff($e_0,e_2$)=(0,0) and d=8, diff($e_0,e_2$) can be modified to (9, 9), then R(0,2)=1 before modification, and R(0,2)=0 after modification.

2. When calculating the distance relationship value, the case of diff($e_0$,ei)=(0,0) should be treated specially. For example, when calculating R(0,i), if diff($e_0$,ei)=(0,0), according to the aforementioned mathematical formula, R ($e_0$, $e_i$) should be 1, but after a special treatment, it is considered that R ($e_0$, $e_i$) is 0, where i is a positive integer.

In other words, the hot pixel noise event in the first storage space or in the first event set should not affect the judgment of whether an event (such as the new event $e_0$) is a noise event. Misjudgment will increase the possibility of judging a noise event as a valid event. The effort of modifying the value of R ($e_0$, $e_1$) from 1 to 0 is exactly to overcome this issue.

In order to improve the time efficiency of deduplication, in another preferred embodiment, it is not necessary to clear up hot pixel noise events in the first event set or in the first storage space. For the new event with coordinate information ($x_0$, $y_0$), for example, assume the distance relationship value is set to 1 if the coordinate information of an event is within the range of ($x_0 \pm dx/2$, $y_0 \pm dy/2$), otherwise it is set to 0, wherein dx and dy are default values with positive real numbers.

In this embodiment, there are dx×dy number of storage units located in a second storage space, each storage unit in the second storage space can only store a value representing 0 or 1, and the coordinate range of the second storage space is [$-dx/2-dx/2$, $-dy/2-dy/2$]. After calculating the difference between the x-coordinate and y-coordinate of the new event $e_0$ and event $e_i$, i.e., diff($e_0$,$e_i$)=($x_i$,$y_i$), if the coordinate ($x_i$,$y_i$) is within [$-dx/2-dx/2$,$-dy/2-dy/2$], then the value of the storage unit with coordinate ($x_i$, $y_i$) in the second storage space is counted as 1; if the coordinate ($x_i$, $y_i$) is outside of [$-dx/2-dx/2$, $-dy/2-dy/2$], there is no need to make any modification to the value in the second storage space. If the value of the storage unit with coordinate ($x_i$, $y_i$) in the second storage space has been 1, then the count is not increased (do not add 1); Because the event $e_1$ is most likely a hot pixel noise event, in a certain type of embodiments, one can even reset the stored value of 1 to 0.

Alternatively, in a certain type of embodiments, for some purpose, even if the distance relationship value in a certain storage unit is allowed to be counted up. When calculating the sum of the relationship values, because the size of the second storage space is already known, the sum of the relationship values Rs can be obtained instead by counting the number of 0s in the second storage space.

In the foregoing embodiment, events with a distance relationship value of 1 are directly filtered out, and the value with a distance relationship value of 1 is correspondingly stored in the second storage space. Because it can only be counted once at most, the hot pixel noise events at the same position in the first event set cannot be accumulated in the summation of distance relationship value.

After performing above operations for all events in the first event set with respect to the new event, all the values in the second storage space are summed, that is, to realize the function of relationship value summation module, and then obtain the sum of relationship values Rs. Preferably, during or after the summation process, the storage unit representing value 1 and has been counted can be reset to 0.

In the present invention, noise event filtering can be achieved through only n storage units which store event coordinate information and time stamps. In some other embodiments, additional dx×dy storage units is employed. The scale of these storage units is not affected by the resolution of the event imaging device. Value of n+dx×dy (for example, 256+8×8=320), usually much smaller than the resolution scale of the event imaging device (for example, 256×256=65536), therefore, the hardware resource utilization of the present invention is much smaller than that of some known prior arts, which is of great significance to the realization of ultra-low power consumption chips.

Figure 16:
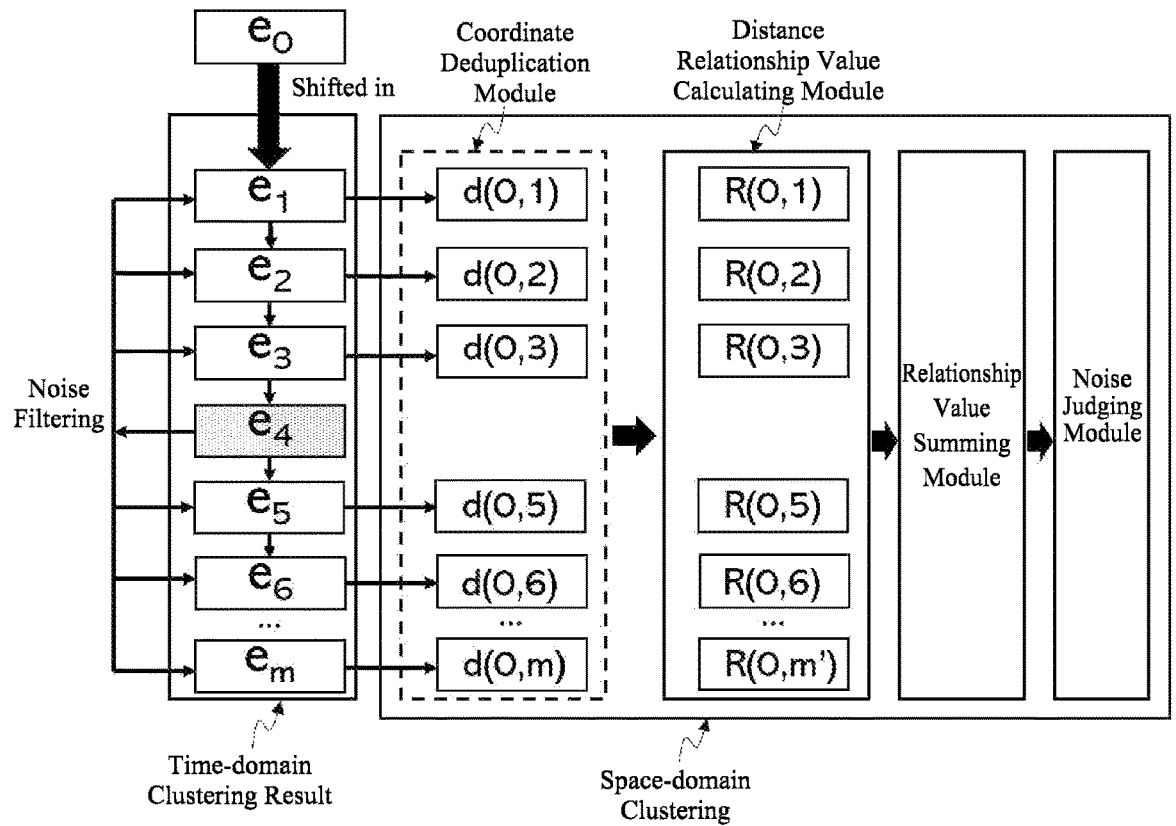
FIG. 16 is a structural diagram of more general space-domain clustering in still another type of denoising solution.

Refer to FIG. 16, which is another embodiment of filtering the first event set in the spatial-domain proposed by the present invention. Unlike the embodiment represented in FIG. 14, the embodiment does not immediately judge whether the new event $e_0$ is a noise event, but only after shifting a certain event, such as event $e_4$, into the first storage space to a certain depth, that the event $e_4$ (event under judgement) is judged as a noise event or not. The logic of judgment is the same as the descriptions in aforementioned embodiments, which will not be repeated here. When determine the first event set, the occurrence time different of the event (for example, the difference of the time stamps) with respect to each other falls within a set range is determined as an element in the first event set. The event in the first event set can occur before the event to be determined, i.e., $e_5 \sim e_m$, or later than the event to be determined, i.e., $e_1 \sim e_3$.

The advantage of judging whether an event is a noise event after shifting into a certain depth of storage space is that a new event just generated at the edge of a moving target may be judged as a noise event in the foregoing embodiment due to insufficient events accumulated in the nearby spatial area, which affects the imaging effect. After shifting into a certain depth, subsequent events are allowed to have a chance to form an effective clustering with that event. Although certain delay is introduced, it can effectively avoid the misjudgment of this type of events and hence improve judgment accuracy.

Figure 17:
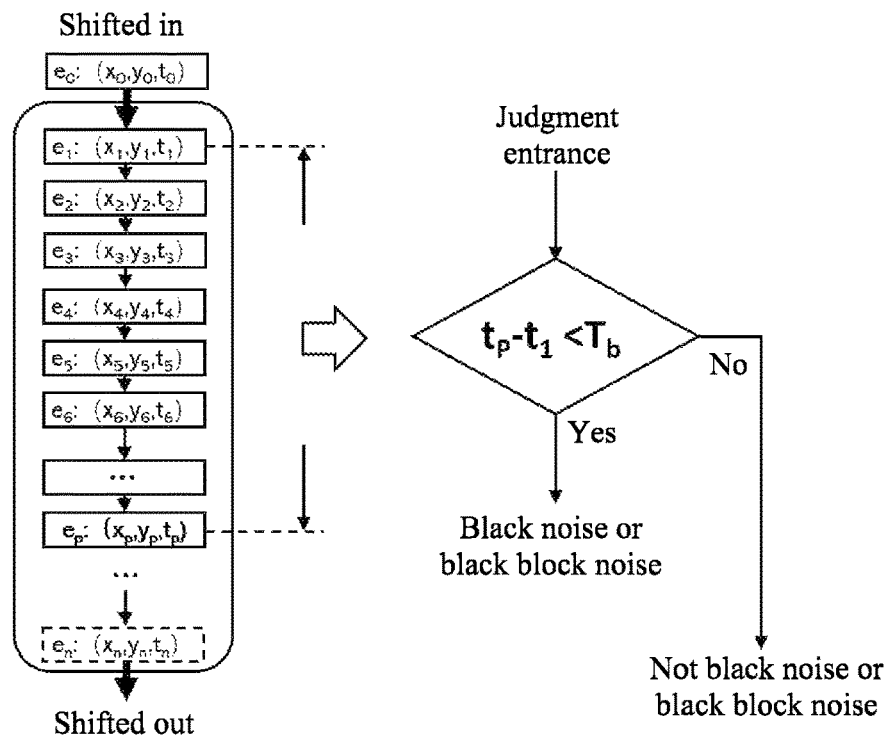
FIG. 17 is a schematic diagram of black noise and black block noise in still another type of denoising solution.

Refer to FIG. 17, which shows a filtering scheme for incremental black noise or black block noise. Black noise or black block noise is a kind of noise with a particularly high frequency. It is caused by the event imaging device's frequent false triggering by all or part of a black block object, or under low light (or no light) conditions. The characteristic of black block noise is that the noise events are continuously generated without interruption, the trigger frequency is much higher than that of normal events, the trigger period is usually less than 10 microseconds, and the frequency is above 100,000 Hz.

In the foregoing embodiments of the present invention, it is very useful to be adopted for the discrimination of black noise or black block noise. Since a large number of events are stored in the first storage space in the order of time stamps, for a certain integer p, the time difference between a third event $e_p$ and the latest event $e_1$ (in another embodiment, the new event is $e_0$) stored in the first storage space is $t_p-t_1$. If $t_p-t_1<T_b$, then it can be judged directly that the events between the third event $e_p$ and event $e_1$ are black noise or black block noise (high frequency noise), otherwise they are not black noise or black block noise. Wherein $t_p$ and $t_1$ are time stamps of the third event $e_p$ and event $e_1$ respectively, $T_b$ is a fourth threshold or a black noise threshold. For example, assume events with a firing frequency not less than 3 microseconds are caused black noise, p=100, then $T_b$ can be set to 300 microseconds.

With the aid of the significant noise filtering effect of the present invention, noise events and valid events can be effectively distinguished. Only when there is a target object moving in front of the event imaging device will the valid events be generated. No valid events will be generated while there are only noise events and without target object moving in front of the event imaging device. Based on this, despite the purpose of noise filtering, the present invention can also be used to determine a target object movement based on whether a valid event is detected. From back-end system's point of view, it is equivalent that there is a function of turn-on (with target object movement) and turn-off (without target object movement) deployed at the front end, which can be applied in certain scenarios with important or specified applications. Conventional filtering schemes cannot realize this function since they cannot remove noise completely, thereby a large number of noise events cannot be filtered out.

Aforementioned denoising device can be implemented in an event imaging device, in the interface circuit between the event imaging device and a neuromorphic chip, or in the FPGAs.

In addition, for events generated by event imaging devices, in addition to using neuromorphic calculation to process these events, there is currently another technical trend that uses a traditional artificial neural network to process the events. The traditional artificial neural network technology processes image or video information in the form of frames. Since static frame images lack dynamic information of object's trajectory, capturing trajectory information is just the merit of an event imaging device. In order to improve the performance of the artificial neural network, some research endeavor to add the dynamic information captured by the event imaging device to the artificial neural network to improve the network performance. Since the present invention can effectively filter out noise events, valid events can represent the movement trajectory data of the object. By feeding the high-quality trajectory data into an artificial neural network, the performance of the artificial neural network can be improved effectively.

The use of filtered valid events is not limited to trajectory information. In certain type of embodiments, it can be used to enhance exposure performance of traditional frame-based cameras based on the high dynamic range of the event imaging device (>120 dB, the traditional camera is about 45-90 dB). For example, when a car passes through a tunnel, the variation of brightness is enormous, and the event imaging device (such as DVS) can capture objects that are too bright or too dark which cannot be detect by traditional cameras.

Figure 18:
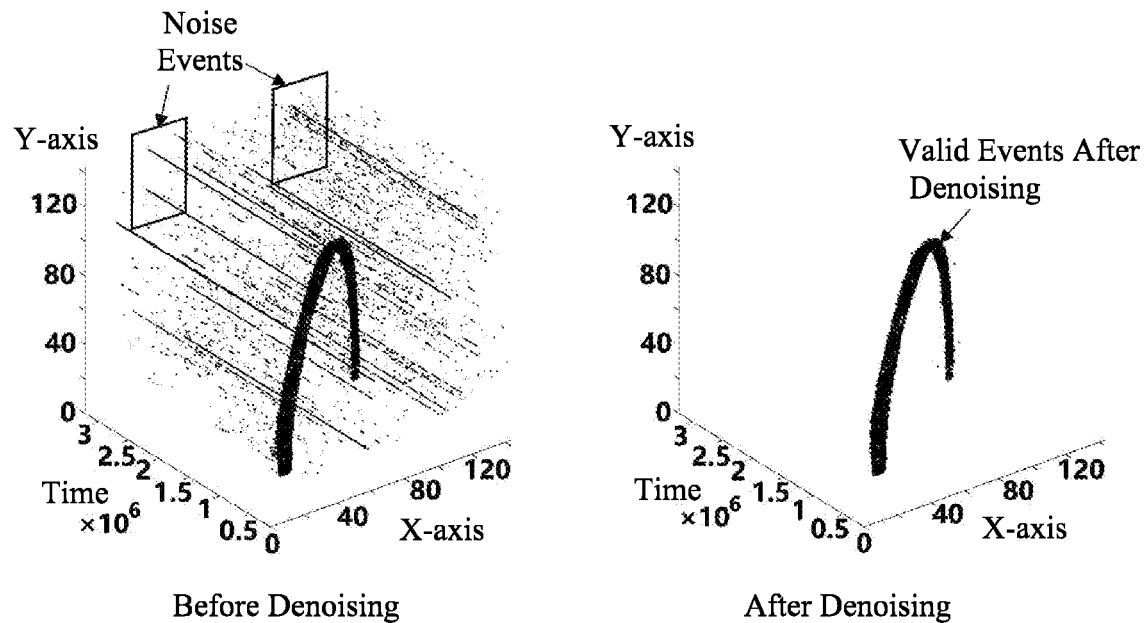
FIG. 18 is a comparison diagram before and after denoising of still another type of denoising solution is performed.

FIG. 18 shows the denoising effect diagram of the actual parabolic process. Before denoising, a large amount of random noise appears during the movement of the object. After denoising, only the events representing the parabolic trajectory are retained. Obviously, the events representing the motion trajectory are basically the same regardless before or after denoising. Therefore, the denoising scheme of the present invention does not cause serious accidental damages to valid events.

Figure 19:
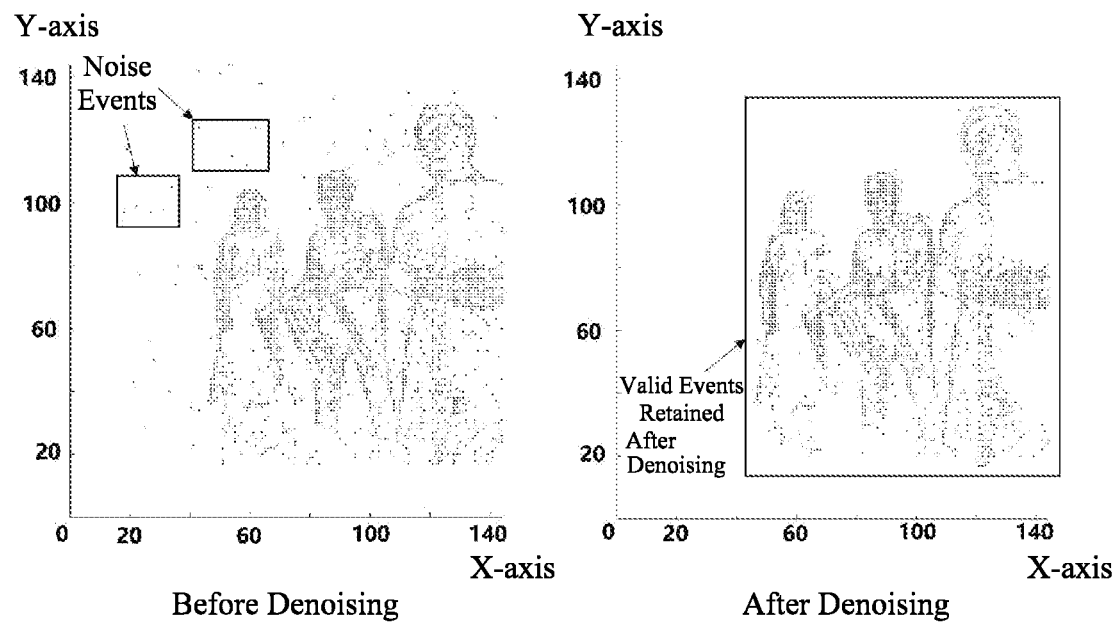
FIG. 19 is a comparison diagram before and after another denoising of still another type of denoising solution is performed.

FIG. 19 shows a denoising effect of people in activity. Before denoising, there are a lot of noise scattered around the characters. After denoising, most of the noise have been eliminated. The parameters adopted in above embodiments are as follows: the first time threshold is 10 milliseconds, register length n=256, distance d=16, and the second threshold is 6~8.

In some type of embodiments, the denoising device/ clustering denoising device/denoising device is implemented in a dedicated interface circuit or specific interface, implemented as an FPGA circuit, or implemented by a combination of hardware and software. Or the denoising method is implemented in an upper computer through software.

In summary, this disclosure further discloses: a chip including the denoising device of any one of the aforementioned embodiments, or including the clustering denoising device of any one of the aforementioned embodiments, or including the denoising device of any one of the aforementioned embodiments; or performs the denoising method of any one of the aforementioned embodiments, or performs the clustering denoising method of any one of the aforementioned embodiments, or performs the denoising method of any one of the aforementioned embodiments. For example, the chip is a neuromorphic chip.

An event-driven vision device including the denoising device of any one of the aforementioned embodiments, or including the clustering denoising device of any one of the aforementioned embodiments, or including the denoising device of any one of the aforementioned embodiments; or performs the denoising method of any one of the aforementioned embodiments, or performs the clustering denoising method of any one of the aforementioned embodiments, or performs the denoising method of any one of the aforementioned embodiments. For example, the event-driven vision device is a DVS.

An electronic device including an event-driven vision device, wherein the electronic device includes the denoising device of any one of the aforementioned embodiments, or includes the clustering denoising device of any one of the aforementioned embodiments, or includes the denoising device of any one of the aforementioned embodiments; or performs the denoising method of any one of the aforementioned embodiments, or performs the clustering denoising method of any one of the aforementioned embodiments, or performs the denoising method of any one of the aforementioned embodiments; to achieve denoising for some events output by the event-driven vision device. For example, the electronic device is a smart home appliance.

Even though we described the details and embodiments of this invention, that can be modified, combined and substituted in any aspect based on our basic ideas. The invention are not limited to the process, machines, manufacture, composition, equipment, device, methods, and steps depicted in the description, and those methods, modules may be implemented in related, dependent, coordinate, upstream/downstream one or more products or methods.

Therefore, the description and attached figures should be deemed simply to be partial embodiments of the solutions in the attached claims. So, we should explain the claims with a maximum reasonable principle, and cover all the modifications, changes, combinations, and equivalents of our disclosures without unreasonable solutions.

To achieve better effects or satisfy some demands, the technician in art may improve our solutions based on our basic ideas. As long as they rely on our basic ideas, cover the characters in claims, even though those changes are inventive and/or progressive, those changes are also located in our protection scope.

Some characters referred in claims may have substitutes. The order of some technical procedures and materials, may be recombined. After learning this invention, the technician in art is easy to get these substituted methods, or change the order of technical procedures, materials. They take almost the same methods to solve almost the same problems, and to get almost the same effects. Even though it's limited by the methods or/and orders in claims, these modifications, changes, substitutions are also located in the protection scope in the claims according to equivalent principle.

Each method and module in the disclosed embodiments of this invention, can be implemented by hardware, software, or their combination. To clarify the interchangeability of the hardware and software, it is depicted in each embodiment by a way of functionality in the above embodiments. These functionalities are finally implemented by hardware or software decided by the specified application in solutions or constraint conditions. The technician in art may take different methods to implement the functionality for each specified application, but these implements are not excluded from the protection scope of this invention.

What is claimed is:

1. A denoising device, wherein the denoising device receives a new event output by an event-driven vision device, wherein a data information of the new event comprises at least a coordinate information of the new event, wherein the denoising device comprises:
   first storage space configured to store a data information of each of some historical events in a first-in-first-out manner, wherein the data information of each of the some historical events comprises at least a coordinate information of each of the some historical events;
   a calculating module configured to calculate a respective coordinate distance between the coordinate information of the new event and the coordinate information of each of the some historical events in the first storage space;
   a first judging module configured to judge whether the coordinate distance is within a first preset range, and obtain a relationship value between the new event and each of the some historical events on the basis of a judgment result;
   a summing module configured to add the relationship value between the new event and each of the some historical events together and obtain a sum of relationship values between the new event and the some historical events, wherein the relationship value between the new event and each of the some historical events is obtained by the first judging module; and
   a second judging module configured to, according to a magnitude relationship between the sum of the relationship values output by the summing module and a second preset value, judge whether the new event is a valid event or a noise event.

2. The denoising device of claim 1,
   wherein the first storage space is a shift register array;
   wherein after the new event is judged to be a valid event or a noise event, the data information of each of earliest at least one event of the some historical events is shifted out of the first storage space, and then the data information of the new event is stored in the first storage space, wherein the data information of the new event comprises at least the coordinate information of the new event.

3. The denoising device of claim 1,
   wherein the calculating module calculates the coordinate distance between the coordinate information of the new event and the coordinate information of each of the some historical events in the first storage space in parallel through addition and/or subtraction.

4. The denoising device of a claim 1,
   wherein each of the following informations further comprises a time information: the data information of the new event and the data information of each of the some historical events;
   wherein the denoising device further comprises a band-pass filtering module configured to perform band-pass filtering on the basis of a time interval between an occurrence of the new event and an occurrence of a latest event in the some historical events.

5. The noise processing device of claim 4,
   wherein both the time information of the new event and the time information of each of the some historical events are timestamps; and the timestamp of the new event is compared with the timestamp of a latest event in the some historical events stored in the first storage space, and when a time interval between the two is greater than a first threshold and less than a second threshold, it is judged that the new event is a valid event.

6. The denoising device of claim 1, wherein the some historical events are replaced by some subsequent events.

7. A clustering denoising device, wherein the clustering denoising device receives some events output by an event-driven vision device, wherein each of the some events comprises at least a coordinate information and a time information, and the some events comprise a first event, wherein the clustering denoising device comprises:
   first storage space configured to store at least the time information of each of the some events;
   a mapping module configured to, according to the coordinate information of the first event, store at least the time information of the first event in a first storage unit located in the first storage space and corresponding to the coordinate information of the first event; and
   a clustering operation module configured to, according to the coordinate information of the first event, determine a clustering range of the first event in the first storage space; on the basis of a relationship between the time information of each of some events stored within the clustering range and the time information of the first event, judge whether the first event has a valid clustering relationship with the some events within the clustering range, and if so, judge the first event to be a valid event, and if not, judge the first event to be a noise event.

8. The clustering denoising device of claim 7, wherein when at least the time information of each of a part of the some events which is generated later than the first event is stored in the first storage space, on the basis of the relationship between the time information of each of the some events stored within the clustering range and the time information of the first event, whether the first event has a valid clustering relationship with the some events within the clustering range is judged; or
   wherein before or after at least the time information of the first event is stored in the first storage unit located in the first storage space and corresponding to the coordinate information of the first event, on the basis of the relationship between the time information of each of the some events stored within the clustering range and the time information of the first event, whether the first event has a valid clustering relationship with the some events within the clustering range is judged immediately.

9. The clustering denoising device of claim 7, wherein the clustering operation module comprises a first threshold judgment module and a second threshold judgment module;
   wherein the first threshold judgment module is configured to, on the basis of the time information of each of the some events, calculate a respective time interval between the first event and each of the some events within the clustering range, compare the time interval that is calculated with a first threshold, and obtain a time relationship value between the first event and each of the some events within the clustering range; and add the time relationship value between the first event and each of the some events within the clustering range together, and obtain a sum of time relationship values of clustering; and
   wherein the second threshold judgment module is configured to compare the sum of the time relationship values of clustering with the second threshold, and according to a comparison result, judge whether the event is a noise event or a valid event.

10. The clustering denoising device of claim 9, wherein the clustering operation module comprises a third threshold judgment module;
wherein the third threshold judgment module is configured with a third threshold, wherein the third threshold is a time threshold or a frequency threshold;
when the third threshold is a time threshold, if an average time interval and/or a maximum time interval of the time interval between the first event and each of the some events within the clustering range is less than the third threshold, the first event is judged to be a noise event;
when the third threshold is a frequency threshold, if an average frequency and/or a minimum frequency of the frequency between the first event and each of the some events within the clustering range is greater than the third threshold, the first event is judged to be a noise event.

11. The clustering denoising device of claim 9,
wherein the first threshold judgment module is configured to calculate the time relationship value between the first event and each of the some events within the clustering range in parallel; and/or add the time relationship value between the first event and each of the some events within the clustering range together in parallel.

12. The clustering denoising device of claim 9, characterized in that:
wherein if the time interval is greater than the first threshold, the time relationship value is 0; if the time interval is less than the first threshold, the time relationship value is 1; and if the sum of the time relationship values of clustering is greater than the second threshold, the first event is judged to be a valid event; otherwise, the first event is judged to be a noise event.

13. A denoising device, configured to perform denoising on an output event set output by an event-driven vision device, wherein the output event set comprises an event to be judged, and each event of the output event set comprises at least a coordinate information and a timestamp information, wherein the denoising device comprises:
first storage space configured to, according to a sequence of each event generated or obtained, store the coordinate information and the timestamp information of each event of the output event set in a first-in-first-out manner;
a time-domain clustering module configured to, according to each timestamp information stored in the first storage space, determine some events each of which has a timestamp difference from the event to be judged being within a preset range and form a first event set;
a space-domain clustering module configured to, according to the coordinate information of each event of the first event set and the coordinate information of the event to be judged, determine whether there are events reaching a preset number within the preset coordinate distance range from the event to be judged in the first event set;
if so, the event to be judged being a valid event, and if not, the event to be judged being a noise event.

14. The denoising device of claim 13, wherein the event to be judged is a new event to be shifted in the first storage space, or the event to be judged is an event that has a preset depth that the event is shifted to within the first storage space.

15. The denoising device of claim 13, wherein according to a difference between the timestamp information of each event of the output event set stored in the first storage space and the timestamp information of the event to be judged, the first event set is determined; or
wherein the events in the first storage space are divided to be within different time windows and according to a difference between the timestamp information of an earliest generated or obtained event in each of the time windows and the timestamp information of the event to be judged, the first event set is determined.

16. The denoising device of claim 13, wherein if the coordinate information of a second event that is of the first event set or is stored in the first storage space is same as the coordinate information of the event to be judged, at least the coordinate information of the second event is deleted.

17. The denoising device of claim 13, wherein the denoising device further comprises second storage space, and according to a size of the preset coordinate distance range of the event to be judged, a number of storage units in the second storage space is determined; and according to the coordinate information of each event of the first event set, each of some events of the first event set is mapped to a storage unit that is in the second storage space and has a corresponding coordinate; and
wherein a value of the mapped storage unit that is in the second storage space and has the corresponding coordinate is 1, and the value of the mapped storage unit is not increased when the same mapped storage unit in the second storage space is mapped multiple times; and if no event of the first event set is mapped to a certain storage unit in the second storage space, a value of the certain storage unit is 0.

18. The denoising device of claim 13, wherein the denoising device further comprises a distance relationship value calculating module configured to, according to a distance between the coordinate information of each event of the first event set and the coordinate information of the event to be judged, judge whether each event of the first event set is within the preset coordinate distance range from the event to be judged, if so, a distance relationship value between the event of the first event set and the event to be judged being 1; otherwise, a distance relationship value between the event of the first event set and the event to be judged being 0;
wherein the denoising device further comprises a relationship value summing module configured to sum distance relationship values between all of the some events of the first event set and the event to be judged, and obtain a sum of the relationship values; and
wherein the denoising device further comprises a noise judging module configured to, according to the sum of the relationship values, judge whether the event to be judged is a noise event.

19. The denoising device of claim 13, wherein the timestamp information of a third event comprised in the first storage space and a timestamp information of a newly stored event in the first storage space or a timestamp information of a new event to be shifted in the first storage space are obtained, a timestamp difference between the two is calculated, and if the timestamp difference is less than a preset black noise threshold, at least an event that is generated or obtained after the third event is judged to be a noise event.

20. The denoising device of claim 13, wherein the difference between the timestamp information of each event and the timestamp information of the event to be judged is calculated in parallel.

* * * * *